US007753972B2

(12) United States Patent
Zubrin et al.

(10) Patent No.: US 7,753,972 B2
(45) Date of Patent: Jul. 13, 2010

(54) PORTABLE APPARATUS FOR EXTRACTING LOW CARBON PETROLEUM AND FOR GENERATING LOW CARBON ELECTRICITY

(75) Inventors: Robert M. Zubrin, Golden, CO (US); Mark H. Berggren, Golden, CO (US)

(73) Assignee: Pioneer Energy, Inc, Lakewood, CO (US)

( * ) Notice: Subject to any disclaimer, the term of this patent is extended or adjusted under 35 U.S.C. 154(b) by 0 days.

(21) Appl. No.: 12/496,456

(22) Filed: Jul. 1, 2009

(65) Prior Publication Data
US 2010/0038082 A1    Feb. 18, 2010

Related U.S. Application Data

(60) Provisional application No. 61/089,554, filed on Aug. 17, 2008.

(51) Int. Cl.
| | |
|---|---|
| B01J 7/00 | (2006.01) |
| H01M 8/06 | (2006.01) |
| C01B 3/36 | (2006.01) |
| C10J 3/46 | (2006.01) |
| C10J 3/54 | (2006.01) |
| E21B 19/00 | (2006.01) |
| E21B 43/16 | (2006.01) |

(52) U.S. Cl. .................. 48/61; 48/197 R; 166/90.1; 166/268; 166/402
(58) Field of Classification Search .................. 48/61, 48/197 R; 166/268, 402
See application file for complete search history.

(56) References Cited

U.S. PATENT DOCUMENTS

| | | | |
|---|---|---|---|
| 6,899,859 B1 * | 5/2005 | Olsvik ................ | 423/437.1 |
| 7,272,934 B2 | 9/2007 | Chandran et al. | |
| 2004/0161377 A1 * | 8/2004 | Davey ................. | 423/359 |

(Continued)

FOREIGN PATENT DOCUMENTS

WO    WO 2008/074980    6/2008

OTHER PUBLICATIONS

U.S. Department of Energy (DOE), Evaluating the Potential for "Game Changer" Improvements in Oil Recovery Efficiency From CO2 Enhanced Oil Recovery. Feb. 2006. Prepared by Vello Kuuskraa and George Koperna for DOE, Office of Fossil Energy, Office of Oil and Natural Gas.

Primary Examiner—Alexa D Neckel
Assistant Examiner—Matthew J Merkling
(74) Attorney, Agent, or Firm—American Patent Agency; Daniar Hussain

(57) ABSTRACT

The Portable Renewable Energy System for Enhanced Oil Recovery ("PRESEOR") is a truck mobile system that reforms biomass into $CO_2$ and hydrogen, following which the gases are separated, with the $CO_2$ sequestered underground for enhanced oil recovery (EOR) and the hydrogen used to generate several megawatts of carbon-free electricity. In contrast to large central power plants that are generally not well-located to support EOR, the small PRESEOR can go directly to the oilfields where it is needed, and do so in a timely manner. The PRESEOR sequesters more biomass-derived carbon than is released by the burning of the oil it yields, thereby producing not only carbon-free electricity but carbon-free oil. Using PRESEOR, over 80 billion barrels of U.S. oil would be made recoverable, without the need to drill new wells in pristine areas.

20 Claims, 14 Drawing Sheets

U.S. PATENT DOCUMENTS

2005/0039400 A1* 2/2005 Lau et al. .................. 48/198.3
2005/0210881 A1* 9/2005 Balan et al. ................. 60/780
2007/0220810 A1* 9/2007 Leveson et al. ......... 48/197 FM
2009/0123364 A1* 5/2009 Forsyth et al. .............. 423/651

* cited by examiner

PORTABLE APPARATUS FOR EXTRACTING LOW CARBON PETROLEUM AND FOR GENERATING LOW CARBON ELECTRICITY

REFERENCE TO RELATED APPLICATIONS

This application claims priority from provisional application U.S. Ser. No. 61/089,554 filed on Aug. 17, 2008, and entitled "A portable biomass reformer for extracting petroleum having net negative $CO_2$ emissions and for generating electricity having zero $CO_2$ emissions," by Robert M. Zubrin and Mark H. Berggren, the entirety of which is hereby incorporated by reference herein.

FIELD OF THE INVENTION

This invention relates to green petroleum and green electricity, having "net negative" $CO_2$ emissions. This invention also relates to the extraction of gasses and liquids from underground and underwater sites and more particularly to petroleum and/or natural gas extraction using gas reformed from biomass. More particularly, the present invention relates to a portable biomass-reforming apparatus that may be taken to the location of a candidate oil field and used to extract oil and/or natural gas.

BACKGROUND OF THE INVENTION

Currently, trillions of dollars worth of oil remain underground in apparently "tapped-out" wells. The invention allows much of this domestic oil to be recovered, while generating clean, distributed electric power and reducing $CO_2$ from the atmosphere. As both oil and clean electricity ($CO_2$-emission-free electricity) represent products whose high value today will only increase in the future, the potential profit from the present invention is quite large.

The U.S. currently produces approximately 5.1 million barrels of oil a day. Most of the oil fields in the U.S. are declining in oil recovery productivity. It has been proven that using $C_{O2}$ for Enhanced Oil Recovery (EOR) can increase oil recovery productivity in the declining fields. The U.S. Department of Energy (DOE) conducted several studies and has deemed $C_{O2}$-EOR to be the most promising solution to increase oil recovery productivity. The DOE estimates that 100 million barrels of "stranded" oil can be recovered using $C_{O2}$-EOR.

The U.S. Department of Energy (DOE) states that "while a mature hydrocarbon province, the U.S. still has 400 billion barrels of undeveloped technically recoverable oil resource. Undeveloped domestic oil resources still in the ground (in-place) total 1,124 billion barrels. Of this large in-place resource, 400 billion barrels is estimated to be technically recoverable. This resource includes undiscovered oil, "stranded" light oil amenable to $CO_2$-EOR technologies, unconventional oil (deep heavy oil and oil sands) and new petroleum concepts (residual oil in reservoir transition zones). The U.S. oil industry, as the leader in enhanced oil recovery technology, faces the challenge of further molding this technology towards economically producing these more costly remaining domestic oil resources. Of the 582 billion barrels of oil in-place in discovered fields, 208 billion has been already produced or proven, leaving behind 374 billion barrels. A significant portion of this 374 billion barrels is immobile or residual oil left behind ("stranded") after application of conventional (primary/secondary) oil recovery technology. With appropriate enhanced oil recovery (EOR) technologies, 100 billion barrels of this 'stranded' resource may become technically recoverable from already discovered fields."

Therefore, there are tens of thousands of depleted oil and natural gas wells around the world, which collectively possess significant amounts of petroleum resources that cannot currently be extracted using conventional extraction techniques.

For example, in a typical oil well, only about 30% of the underground oil is recovered during initial drilling ("primary recovery"). An additional approximately 20% may be accessed by "secondary recovery" techniques such as water flooding. In recent years, "tertiary recovery" (also known as "Enhanced Oil Recovery" or EOR) techniques have been developed to recover additional oil from depleted wells. Such tertiary recovery techniques include thermal recovery, chemical injection, and gas injection. Using current methods, these tertiary techniques allow for an additional 20% or more of the oil to be recovered.

Gas injection is one of the most common EOR techniques. In particular, carbon dioxide ($CO_2$) injection into depleted oil wells has received considerable attention owing to its ability to mix with crude oil. Since the crude oil is miscible with $CO_2$, injection of $CO_2$ renders the oil substantially less viscous and more readily extractable.

Despite the potential advantages of $CO_2$ in enhanced recovery, its use has been hampered by several factors. For instance, in order for the enhanced recovery process to be economically viable, the $CO_2$ gas must be naturally available in copious supplies at reasonable cost at or near the site of the oil well. Alternatively, $CO_2$ can be produced from industrial applications such as natural gas processing, fertilizer, ethanol and hydrogen plants where naturally occurring $CO_2$ reservoirs are not available. The $CO_2$ must then be transported over large distances via pipeline and injected at the well site. Unfortunately, such $CO_2$ pipelines are difficult and costly to construct.

For most oil fields, a $CO_2$ pipeline is not a viable option because of a mix of several problems: (a) The capital investment for building a pipeline—sometimes tens or hundreds of millions of dollars; (b) The time-frame of building a pipeline—several years; (c) The distance and terrain issues between the source and destination which either makes the pipeline impossible or simply not economical; (d) The time it takes to obtain easement rights and permits is long; and (e) The time it takes to start generating an increase in productivity—the return on investment (ROI) is too long.

For example, Anadarko Petroleum Corporation built a 125-mile $CO_2$ pipeline in Wyoming from an ExxonMobil gas plant to Salt Creek, Wyo., a 100-year old oil field. They expect to increase production from approx. 5,000 bbl/day in 2005 to approx. 30,000 bbl/day by 2010. However, the project cost hundreds of millions of dollars, and took over 5 years of planning, permitting, and construction to complete. Therefore, when faced with the hurdles and overall costs of the pipeline-delivered $CO_2$, as described above, tertiary $CO_2$ EOR simply does not make economical sense for most oil fields, especially small producers scattered all over the United States and the world.

In the past, the idea of using the exhaust from fossil-fuel fired electricity plants for EOR has been widely discussed. However, the electrical industry, for reasons of economy of scale, has based itself primarily on large (500 MWe to 1000 MWe) central power stations, located near their primary metropolitan markets. For many reasons, including notably those laid out above, as well as the fact that flue gases from conventional fossil power plants typically contain relatively low (<10%) $CO_2$ concentrations, such stations offer little potential utility for supporting EOR, especially by small producers.

Another gas that can potentially be used for enhanced recovery purposes is hydrogen. However, hydrogen has received considerably less attention than $CO_2$. Hydrogen, although somewhat soluble with oil, is believed less so than $CO_2$. Moreover, traditionally, hydrogen has been costly to produce and its use has not been justified from an economic standpoint.

The rising cost of crude oil, as high as $120 to $140 per barrel in recent times (summer of 2008), has increased interest in new enhanced oil recovery technologies. There is speculation that crude petroleum may sell for as high as $200 or more per barrel. Simultaneously, the low cost of biomass, often lower than $40 per ton, has made biomass an attractive fuel source for EOR purposes.

Accordingly, as recognized by the present inventors, what are needed are a novel method, apparatus, and system for extracting oil/petroleum from the ground or from oil wells, such as depleted oil wells, by utilizing driver gases generated from a biomass source. What are also needed are a method, apparatus, and system for extracting natural gas from the ground or from natural gas wells by utilizing driver gases generated from a biomass source.

Therefore, it would be an advancement in the state of the art to provide an apparatus, system, and method for generating large quantities of carbon dioxide, hydrogen and other gases from biomass or a derivative of biomass at low cost at or near an oil site.

It is against this background that various embodiments of the present invention were developed.

BRIEF SUMMARY OF THE INVENTION

One embodiment of the present invention is called a "Portable Renewable Energy System for Enhanced Oil Recovery and Global Warming Prevention" (PRESEOR). That is, one embodiment of the present invention is a portable system for generating $CO_2$ and hydrogen from biomass, directly at the oil field, allowing for cost-effective $CO_2$-EOR, with an immediate additional revenue stream from distributed generation of clean electricity.

One embodiment of the invention is a modular portable renewable energy systems scaled to produce $CO_2$ at a rate of about 1 million cubic feet per day through the steam reformation of biomass into $CO_2$ and hydrogen. Since it takes about 10,000 cubic feet of $CO_2$ to yield one barrel of oil, this is sufficient to yield 100 bbl/day of oil, a figure of interest to numerous small producers. At the same time, the PRESEOR will produce enough hydrogen to generate about two MWe of electricity, which can be sold into the grid in the same manner as is currently being widely done by wind power installations of comparable output (but inferior dispatchability).

In order to insure that its energy supply is renewable and to maximize the carbon sequestration benefits, the PRESEOR uses biomass as its feedstock. However it should be noted that the PRESEOR could also be used to produce carbon-free electricity from any carbonaceous material, including not only biomass but also recycled paper, plastic, trash, as well as coal and derivatives thereof.

The main advantages of the PRESEOR include:
1. Portable $CO_2$ production at the oil field—overcoming any geographic and economic constraints;
2. $CO_2$ sequestration costs well below industry defined "economically viable limits;"
3. Converting byproduct hydrogen into clean energy as immediate income stream generator; and
4. Net reduction in atmospheric $CO_2$.

The present invention may be delivered to the site of the oil well by various methods of transportation, including a truck, a boat, or an airplane. The scale of the present invention is simultaneously portable and also sized to generate sufficient driver gas for economic recovery of oil. Some examples of biomass that may be used include, but are not limited to, corn stover, plant material, hemicelluloses, forestry residue, bio-fuel, bio-crude, switch-grass, etc.

In one embodiment of the present invention, the portable apparatus generates $CO_2$ and hydrogen by a biomass reforming reaction. The $CO_2$ is injected into the well while the hydrogen is split off from the $CO_2$ product to be used for other purposes, including electrical power generation or petro-chemical processing. As will be discussed below, the hydrogen may also be injected simultaneously with the $CO_2$. Depending upon factors such as the particular composition of the underground oil, as well as the local cost of electrical power, an operator of the present invention may find it advantageous to use hydrogen in different proportions for these various purposes. Furthermore, if advantageous, the hydrogen may be injected by itself while the $CO_2$ is used for other purposes.

In another embodiment of the present invention, biomass is combusted to generate flue gas, wherein the flue gas is separated into a carbon dioxide gas stream and a nitrogen gas stream, with the carbon dioxide gas stream used for enhanced oil recovery, and the nitrogen gas stream vented to the atmosphere.

In yet another embodiment of the present invention, biomass is gasified to generate hydrogen and carbon monoxide, and the carbon monoxide is water-gas-shifted to generate carbon dioxide, after which the carbon dioxide gas is separated for use in enhanced oil recovery.

In an alternative embodiment of the present invention, solid biomass is first converted into liquid bio-fuel or bio-crude in a central bio-processing facility, and the bio-fuel is transported to the site of the oil field and used as the fuel for the PRESEOR in place of solid biomass.

Therefore, and according to one broad aspect of one embodiment of the present invention is an apparatus for generating a high-pressure carbon dioxide-rich driver gas and a hydrogen-rich fuel gas from biomass and water, comprising a boiler adapted to boil the water to generate steam; a steam reformer adapted to react the biomass with the steam at high-pressure in an absence of oxygen to generate a high-pressure gas comprising carbon dioxide gas and hydrogen gas; a methanol $CO_2$ separator adapted to separate at high-pressure at least a portion of the carbon dioxide gas from the high-pressure gas to generate the high-pressure carbon dioxide-rich driver gas and the hydrogen-rich fuel gas; and a furnace adapted to utilize a portion of the hydrogen-rich fuel gas to generate heat to drive the steam reformer.

Another embodiment of the present invention is the apparatus described above further comprising a gas turbine adapted to utilize a portion of the hydrogen-rich fuel gas to generate electricity.

Yet another embodiment of the present invention is the apparatus described above further comprising a heat exchanger disposed between the boiler and the steam reformer adapted to exchange heat between the hot high-pressure gas exiting the steam reformer and the steam entering the steam reformer from the boiler.

Yet another embodiment of the present invention is the apparatus described above further comprising a condenser disposed after the heat exchanger adapted to condense cooled high-pressure gas entering the methanol $CO_2$ separator from the heat exchanger.

Yet another embodiment of the present invention is the apparatus described above further comprising a compressor adapted to compress the carbon dioxide-rich driver gas to a pressure appropriate for injection into a petroleum reservoir to extract oil.

Yet another embodiment of the present invention is the apparatus described above wherein the boiler operates at a temperature of approximately 150° C. to 250° C.

Yet another embodiment of the present invention is the apparatus described above wherein the steam reformer operates at a temperature of approximately 600° C. to 1000° C.

Yet another embodiment of the present invention is the apparatus described above wherein the steam reformer operates at a pressure of approximately 5 bar to 30 bar.

Yet another embodiment of the present invention is the apparatus described above wherein the methanol $CO_2$ separator operates in a temperature-swing cycle between approximately −60° C. and +40° C.

Yet another embodiment of the present invention is the apparatus described above wherein the hydrogen-rich fuel gas further comprises methane.

Yet another embodiment of the present invention is the apparatus described above wherein the hydrogen-rich fuel gas further comprises carbon monoxide.

Yet another embodiment of the present invention is the apparatus described above further comprising a control system adapted to control an operation of the apparatus based on a market price of biomass, a market price of electricity, and a market price of crude petroleum.

Yet another embodiment of the present invention is the apparatus described above wherein the carbon dioxide-rich driver gas is at least 90% $CO_2$ by weight.

Yet another embodiment of the present invention is the apparatus described above wherein the carbon dioxide-rich driver gas is at least 99% $CO_2$ by weight.

Yet another embodiment of the present invention is the apparatus described above wherein an amount of carbon dioxide released when the oil is consumed is less than an amount of carbon dioxide injected underground to extract the oil.

Yet another embodiment of the present invention is the apparatus described above wherein the electricity generated has substantially less associated carbon dioxide emissions than electricity generated from combustion of natural gas.

Yet another embodiment of the present invention is the apparatus described above wherein the steam reformer is selected from the group consisting of a fixed bed reformer, a fluidized bed reformer, and an entrained-flow reformer.

Another embodiment of the present invention is a method for extracting oil or natural gas from an oil well, comprising: providing a portable biomass reforming apparatus at a site of the oil well; delivering a quantity of biomass from a biomass source to the site of the oil well; feeding the biomass and a quantity of water into the portable biomass reforming apparatus; reacting the biomass and the water in the portable biomass reforming apparatus in an absence of oxygen to generate a driver gas comprising a mixture of hydrogen gas and carbon dioxide gas; separating the driver gas using a high-pressure methanol $CO_2$ separation process into a substantially carbon dioxide gas stream and a hydrogen gas stream; compressing the carbon dioxide gas stream to a pressure appropriate for the oil well; injecting the compressed driver gas into the oil well; and recovering oil from a production well.

Yet another embodiment of the present invention is the method described above further comprising generating electric power from the hydrogen gas stream, wherein the electric power is generated with low carbon dioxide emissions into the atmosphere.

Yet another embodiment of the present invention is a method for extracting oil from a near depleted oil well and for generating electricity at the site of the oil well, the method comprising the steps of: transporting a portable biomass reforming apparatus to the oil well, the portable biomass reforming apparatus having a biomass reformer module, a gas separator module, a power generator module, a gas compressor module, and an injection module; delivering a quantity of biomass from a biomass source to the site of the oil well; reforming the biomass with a quantity of water in an absence of oxygen to generate driver gas, the driver gas comprising a mixture of hydrogen gas and carbon dioxide gas; separating a portion of the hydrogen gas from the rest of the driver gas exiting the portable biomass reforming apparatus using a high-pressure methanol separation process; generating power using a portion of the separated hydrogen gas, where the electric power is generated with little carbon dioxide emissions into the atmosphere; pressurizing the rest of the driver gas to a pressure appropriate for injection into the oil well; injecting the pressurized driver gas into the oil well; and recovering oil from a production well, wherein an amount of carbon dioxide released when the oil is consumed is less than an amount of carbon dioxide injected underground to extract the oil.

Other features, utilities and advantages of the various embodiments of the invention will be apparent from the following more particular description of embodiments of the invention as illustrated in the accompanying drawings.

DETAILED DESCRIPTION OF THE INVENTION

Definitions of Terms

Throughout this disclosure, the symbol "kcf" shall stand for "thousand standard cubic feet," usually of $CO_2$ unless explicitly stated otherwise. The symbol "MMcf" shall stand for "million standard cubic feet," usually of $CO_2$ unless explicitly stated otherwise. That is, a reformer that produces 1 kcf/day of driver gas produces 1,000 standard cubic feet of driver gas per day, while a reformer that produces 1 MMcf/day of driver gas produces 1,000,000 standard cubic feet of driver gas per day. The word "day" shall mean "a day of operations," which could be an 8-hour day, a 12-hour day, a 24-hour day, or some other amount of time, depending on how a particular oil field is being operated. Please note that other sources may use different symbols, such as "mcf" for "thousand cubic feet" based on the Roman numeral "M" for thousand, and care should be taken in terminology when consulting such sources.

Introduction

Through innovative design of a mobile, miniaturized biomass reforming plant, the Portable Renewable Energy System for Enhanced Oil Recovery ("PRESEOR") reforms biomass, which is available nearly anywhere in the United States at low cost, into $CO_2$ and hydrogen at the oil-field site, eliminating any gas transportation infrastructure costs which are extremely high. The $CO_2$ is used to produce the otherwise inaccessible oil and the hydrogen is either burned on-site to produce clean electricity, to be sold to the local utilities, or it can be mixed with the $CO_2$ and injected into the oil-well to produce even more oil, depending on which of the two methods produces higher monetary value to the operator.

As a result of the fact that the $CO_2$ injected into the ground comes from biomass whose carbon came from the atmosphere, the electricity generation process of the PRESEOR system not only produces power without emission of $CO_2$ into the environment, it actually reduces atmospheric $CO_2$. In fact, in one embodiment, the amount of carbon sequestered in the process may be on average about 5-30%, and preferably 20-30%, greater than the amount of carbon in the oil recovered. Thus, not only the electricity, but even the oil produced by the PRESEOR can be said to be truly "green," since it has been fully paid for by the carbon sequestered to get it.

Figure 9:
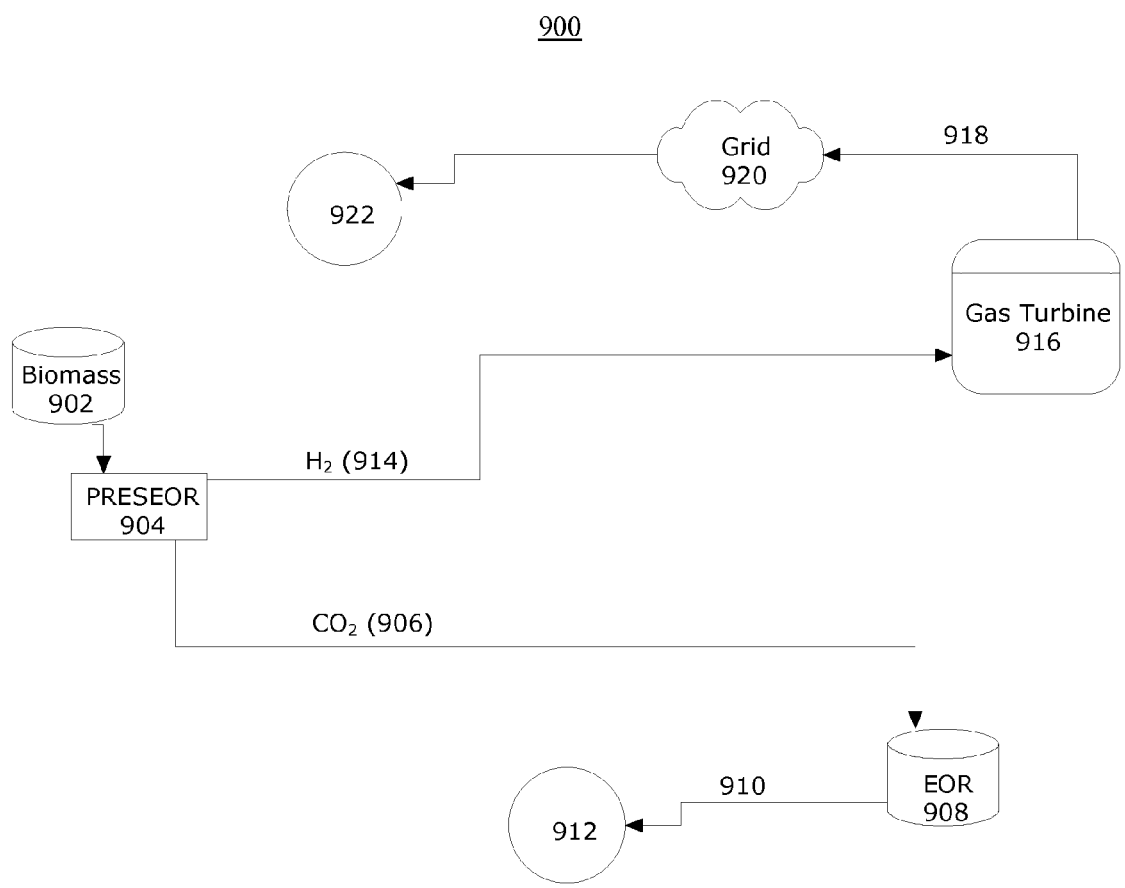
FIG. 9 illustrates a sample flow of materials associated with the PRESEOR apparatus according to one embodiment the present invention.

FIG. 9 illustrates an average scenario (900) where a small to medium oil field operator utilizes a PRESEOR system that is capable of generating one million cubic feet of $CO_2$ a day (or 1,000 kcf) and 1,400 kcf of hydrogen. In this scenario, the $CO_2$ is sequestered underground in the field, generating about 100 extra barrels of oil per day, while the hydrogen is burned on site to generate emissions-free, distributed electricity which is sold to a local utility grid.

The oil operator may pay a licensing fee per metered kcf of $CO_2$ and $H_2$ produced, or may own the PRESEOR apparatus outright. Approximately 31 tons of biomass (2 truckloads) is delivered to the field site per day (902). The biomass is pulverized and fed into the PRESEOR (904). Approximately 1,000 kcf of $CO_2$ is generated (906), and sequestered underground in an oil field (908). About 100 extra barrels of oil is generated (910) by the oil field operator (912), who pays a license fee to the owner of the PRESEOR (not shown). Simultaneously, about 1,400 kcf of hydrogen is generated per day (914), which is fed to a portable 1.8 MW gas turbine (916), which generates about 1.8 MW of constant electrical power (918). The electricity is used for local field operations or fed to the utility grid (920), which pays, say, $0.06/kW-hr to the oil field operator (922), who pays a license fee to the owner of the PRESEOR (not shown).

As described in detail below (paragraph 106), the oil operator of FIG. 9 will have increased his or her yearly revenue by $4.4 million for each PRESEOR unit operated, with net profits of about $3.2 million per year. Total capital cost of the system would be around $3,000,000 and would have been returned within the first year. In a small field that used to produce 1,000 barrels a day ten years ago and is now only producing 500/day because of natural decline, three PRESEOR units could be deployed to increase oil production to almost peak capacity, generating about $9.6 million in profits per year for the operator. The above profits from this operation would increase substantially as $CO_2$ emission credits are sold in the global market, as the system would in effect be creating extensive "negative emissions" credits.

Figure 10:
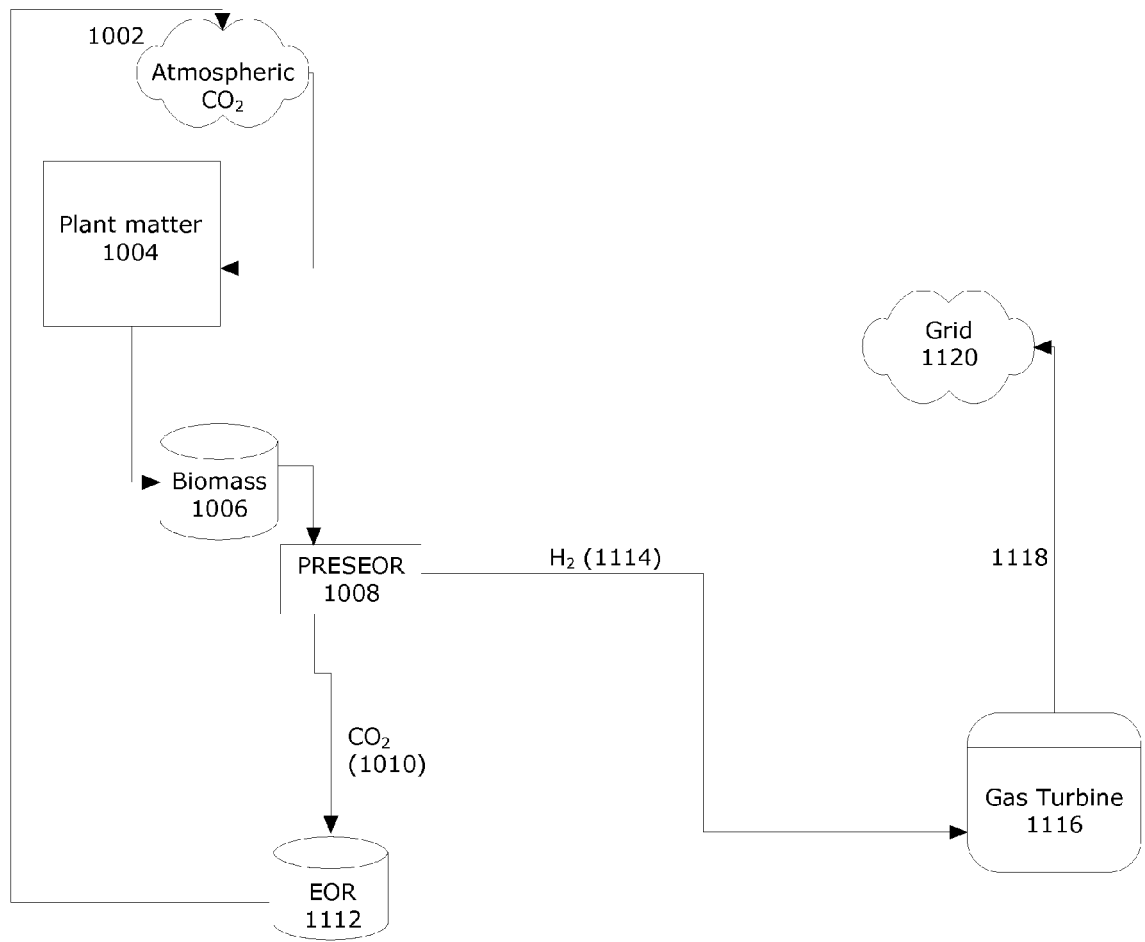
FIG. 10 illustrates a sample flow of $CO_2$ associated with the PRESEOR apparatus according to one embodiment of the present invention, showing net reductions of atmospheric $CO_2$.

FIG. 10 illustrates a scenario (1000) where a small- to medium-sized oil field operator uses a PRESEOR system capable of generating one million cubic feet of $CO_2$ a day (or 1,000 kcf) and 1,400 kcf of hydrogen. In this scenario, the $CO_2$ is sequestered underground in the field, generating about 100 extra barrels of oil per day while the hydrogen is burned on site to generate emissions-free, distributed electricity which is sold to a local utility grid. In the discussion below, the figure illustrates the amount of $CO_2$ sequestered for each barrel of oil produced and clean electricity generated.

In FIG. 10, atmospheric $CO_2$ is captured by plant matter during the course of the natural carbon cycle (1002). The carbon ends up in the plant matter biomass (1004), which is harvested for use in the PRESEOR. About 307 kg of biomass (1006), which contains about 138 kg of carbon, is fed into the PRESEOR (1008). The PRESEOR (1008) generates about 10 kcf of $CO_2$ (1110), which is used to extract an extra barrel of oil from an oil field (1112). One barrel of oil contains about 120 kg of carbon, out of which, on average, about 103 kg is released as $CO_2$ when the oil is consumed (shown as an arrow from 1112 to 1002). Thus, about 30% more carbon is sequestered underground than is released when the oil is ultimately consumed, for example, in a vehicle driving on a highway.

Simultaneously, as shown in FIG. 10, hydrogen is also generated (1114), which is fed to a portable, 1.8 MW gas turbine (1116), which generates clean electricity (1118), which can be used for local field operations, or sold to the utility grid (1120). This electricity is carbon-free, since $H_2$ is a clean-burning fuel and does not release any $CO_2$ upon combustion in the gas turbine.

Therefore, according to one broad aspect of one embodiment of the present invention, both carbon-negative oil and carbon-free electricity may be generated using the principles of the present invention in an economical and financially profitable manner.

INDUSTRIAL APPLICATIONS OF THE PRESENT INVENTION

The worldwide oil industry today faces declining productivity in numerous oil fields that have reached a near-depleted state where the standard extraction methods can no longer provide profitable results.

A typical oil field goes through three distinct phases:

Phase 1—Primary recovery: The average initial recovery produces about 30% of the oil in the reservoir and is accomplished by relying on the existing underground gas pressure.

Phase 2—Secondary recovery: An additional 10%-30% of the underground oil can be extracted from the reservoir using such methods as water flooding. Towards the end of Phase 1 there is a gradual decline in oil recovery productivity, leading to a transition into Phase 2, which boosts oil recovery productivity by injecting water to drive the oil out of the reservoir. When Phase 2 nears completion, however, most oil fields cannot transition into Phase 3 because it is not economically feasible to do so.

Phase 3—Enhanced Oil Recovery (EOR): Carbon dioxide ($CO_2$) gas flooding can be used in order to extract about 20% more oil from the reservoir, extending the productive life of the field by 10-25 years. When an oil field's productivity declines towards Phase 3 and enters a certain low profitability plateau, it is considered to be "depleted". At this point, the field may be capped and abandoned or otherwise minimally operated, unless it is able to utilize EOR techniques in a profitable way.

While Phase 1 and Phase 2 are not very complex and yield high profit margins, Phase 3 poses a problem for literally thousands of oil fields in the U.S. alone and many thousands more worldwide.

As discussed in the Background of the Invention, the major problem with $CO_2$-EOR is that for most oil fields, $CO_2$ is not readily available at or near the oil site. This means that the $CO_2$ must be obtained from natural or industrial sources, and delivered to the oil field over long distances, usually via a pipeline. For most oil fields, a $CO_2$ pipeline is not a viable option because of a mix of several problems, including but not limited to, the capital investment for building a pipeline—sometimes tens of millions of dollars; the time-frame of building a pipeline—several years; the distance and terrain issues between the source and destination which either make the pipeline impossible or simply not economical; and the time it takes to start generating an increase in productivity—return on investment (ROI) is long.

When faced with the hurdles and overall costs of the pipeline-delivered $CO_2$, as described above, the Phase-3 $CO_2$ EOR simply does not make economical sense for most oil fields. According to several studies conducted by the U.S. Department of Energy, there are thousands of oil fields in the United States that cannot achieve a financially viable $CO_2$-EOR production with the currently available $CO_2$ sources and technologies, due to economic and geographic constraints with the current available $CO_2$ sources and technologies.

For example, one DOE study found that "$CO_2$ enhanced oil recovery (EOR) is usually only applied when there is an abundant $CO_2$ source nearby the well. This is certainly not the case in Kansas where there are hundreds of millions of barrels of oil available that is currently out of reach because there is no local source of $CO_2$."

Oil fields such as the Kansas example above and many others, including oil fields in Pennsylvania, Ohio, West Virginia, Kentucky, Colorado, Wyoming, California, etc. are potential places of application for the present invention.

The innovative Portable Renewable Energy System for Enhanced Oil Recovery ("PRESEOR") produces both carbon dioxide gas ($CO_2$) and hydrogen gas ($H_2$) at low cost, specifically tailored to the needs of oil fields that are facing declining productivity and require Enhanced Oil Recovery.

The key factors behind the PRESEOR solution to the EOR challenges are:

1. Reforming biomass and water into $CO_2$ and hydrogen. Biomass from crop or forestry residues is very common, cheap and commercially available almost anywhere in large quantities and its use adds no $CO_2$ to the environment, making it an ideal fuel stock.
2. Overall gas production cost is well below $2 per thousand cubic feet (kcf) of $CO_2$—providing a large margin to the DOE's $2/kcf $CO_2$ threshold of economic viability.
3. Added value from hydrogen, which may be used either to produce "green" electricity or for more efficient oil recovery.
4. On-site gas production at the oil field—overcoming the geographic and financial constraints of delivering $CO_2$ to the oil field, eliminating the need for expensive pipelines and large gas plants.
5. Modular: The PRESEOR may be modular—allowing use of fuels other than biomass, when such fuels are naturally available at the oil field, such as "stranded" natural gas that would otherwise be flared.
6. Portable: The PRESEOR can be mounted on any truck—the PRESEOR can be transported to any oil field at a minimum cost and the PRESEOR is easily transportable from field to field, if desired.
7. Green Electricity: The PRESEOR produces electricity without harmful greenhouse gas emissions—proposals are being considered to create taxes on $CO_2$ emissions—the PRESEOR would allow oil to be recovered without incurring these tax penalties. Further income could be obtained by selling carbon credits to others.

According to the U.S. Department of Energy, at an oil price of $60/bbl, operators are willing to undertake EOR if $CO_2$ can be obtained for a price of $2/kcf. This effectively defines a market price for $CO_2$ at such oil sites at $4.50/kcf of $CO_2$ at September 2008 oil prices of $140/bbl.

Hydrogen is valuable in at least three possible ways:

1. Hydrogen can be burned to produce electricity.
2. Hydrogen could be effective in extracting oil when injected into the ground along with the $CO_2$.
3. Hydrogen can be used in chemical processes to hydrogenate heavy oils, increasing their value, as well as for other purposes.

The economic effectiveness of the PRESEOR can be evaluated in two scenarios: The first scenario is based on the assumption that hydrogen is less than 60% as efficient as $CO_2$ for oil recovery and therefore the hydrogen would be used to produce electricity rather than for oil recovery. The second scenario is based on the assumption that hydrogen is more than 60% as efficient for oil recovery as $CO_2$ and therefore the hydrogen would be used for enhancing oil recovery by being injected into the oil well with the $CO_2$.

Steam Reforming of Biomass and $H_2$ Used to Generate Electricity

The first scenario is more conservative than the second scenario, so it is presented here to demonstrate the potential profitability of the PRESEOR. In this scenario, the $CO_2$ produced will be used for EOR, while all of the hydrogen will be used for power generation.

Steam reformation of biomass occurs approximately in accord with the following reaction:

$$C_4H_6O_3 + 5H_2O \Rightarrow 4CO_2 + 8H_2 \quad \Delta H = +118 \text{kcal/mole} \quad (1)$$

If two of the hydrogen molecules are burned to provide process heat, 114 kcal of energy can be released. So the burning of two moles of hydrogen can drive 1 unit of reactions (1) for a net reaction of:

$$C_4H_6O_3 + 3H_2O + O_2 \Rightarrow 4CO_2 + 6H_2 \quad \Delta H = +4 \text{kcal/mole} \quad (2)$$

Reaction (2) is essentially energy neutral. While the oxygen used in reaction (2) could be injected directly into the steam reformation reactor, this would either require expensive oxygen separation technology, or compressing air into the ~10 bar steam reformation system, which involves high energy costs and also dilutes the $CO_2$ product with large amounts of nitrogen. Such nitrogen diluent makes subsequent $CO_2$ separation difficult for sequestration, and so if underground $CO_2$ sequestration is desired, such autothermal approaches are disadvantageous. Therefore, in the preferred PRESEOR system, reaction (1) is driven by an external gas-fired furnace deriving its energy from hydrogen combustion which is fueled by utilizing $\frac{1}{4}^{th}$ of the hydrogen produced by reaction (1).

Compared to air or oxygen blow gasification, the PRESEOR system offers the critical advantages that it yields a high pressure gas mixture that is ⅓ $CO_2$ by mole, with no nitrogen present, and no need to separate oxygen or compress air. Indeed, the only compression work required to feed a high pressure steam reformation system is the very small amount needed to bring liquid water up to an elevated pressure prior to boiling. Such high pressure, high concentration $CO_2$ is much easier to separate from the other exhaust gases than the low pressure, low concentration $CO_2$ present in gasifier or conventional combustion flue gas exhaust, and thus, if a system is to be designed for the primary purpose of securing $CO_2$ for sequestration and particularly for enhanced oil recovery, this is the preferred system design option.

If the steam reformation is carried out completely in accord with reaction (1), it will produce a gas mixture that is 33% $CO_2$. This concentration can be reduced somewhat by reverse water-gas-shift side reactions that may occur, i.e.:

$$CO_2 + H_2 \Rightarrow CO + H_2O \quad \Delta H = +9 \text{kcal/mole} \quad (3)$$

Or increased as a result of methanation side reactions:

$$CO_2 + 4H_2 \Rightarrow CH_4 + 2H_2O \quad \Delta H = -41 \text{kcal/mole} \quad (4)$$

However, on net, a $CO_2$ concentration (in the gas after water knockout) over 30% can be achieved. This $CO_2$ concentration is much higher than that available in combustion flue gas, and is very favorable for $CO_2$ separation.

Reaction (3) is undesirable, but it has a low equilibrium constant (~0.1 at 400° C.) and can be nearly entirely suppressed by running the system steam rich. Reaction (4) is a mixed blessing and curse. While it removes $CO_2$, it actually increases the fraction of $CO_2$ in the exhaust (by removing 4 hydrogen molecules for every one $CO_2$ that is removed), making efficient separation easier. The methane it produces also adds to the volumetric energy content of the exhaust gas, which enhances electricity production. Furthermore, since reaction (4) is exothermic, it can substantially reduce further the amount of hydrogen that needs to be burned in the furnace to help drive reaction (1). While it has a high equilibrium constant (~$10^6$), it can be mostly suppressed in favor of reaction (1) by running the system steam rich. Assuming, however, that one in four $CO_2$ molecules produced by reaction (1) is consumed by reaction (4), and we use the extra energy to cut the hydrogen furnace fuel requirement, we obtain a net reaction:

$$C_4H_6O_3 + 2H_2O + \tfrac{1}{2}O_2 \Rightarrow 3CO_2 + CH_4 + 3H_2 \quad \Delta H = +18 \text{kcal/mole} \quad (5)$$

Reaction (5) is endothermic, but only to a mild degree, so it can be driven forward by superheating the input steam in the furnace.

The part of reaction (5) occurring in the steam reformer alone is:

$$C_4H_6O_3 + 3H_2O \Rightarrow 3CO_2 + CH_4 + 4H_2 \quad \Delta H = +75 \text{kcal/mole} \quad (6)$$

It will be observed that the $CO_2$ fraction of the steam reformer exhaust gas has risen to 43%.

Reaction (6) is best done at moderate pressure, with 10 bar being adequate to get good results. Since the only gas that needs to be fed to the system is steam, which is derived from water which is initially pressured in the liquid phase, the required compression energy is minimal. Running reaction (6) at high pressure also has the advantage of producing high pressure exhaust gas, which simplifies the task of separating the $CO_2$ from the other product gases. In addition, the presence of moderate-pressure high-temperature steam in the reactor acts to suppress coking and to destroy tars and oils emitted from the biomass.

Let us consider the economics of a Pioneer PRESEOR unit operating on a small producer field. Depending on the field, it takes between 5,000 and 10,000 cubic feet of $CO_2$ to produce 1 barrel of oil. We adopt the more conservative number of 10,000 cubic feet/bbl. In that case, it will take 56 metric tons of $CO_2$ per day to produce 100 barrels per day of oil. Examining reaction (6), we see that 3 $CO_2$ molecules with a total molecular weight of 132 are produced for every unit of biomass with a molecular weight of 102, for a wither ratio of about 1.3. Thus producing 56 metric tons of $CO_2$ will require 43 tons of biomass. Currently, corn stover can be obtained for about $40 per ton, delivered cost, within 50 miles. Thus 43 tons of corn stover would go for a cost of about $1720. Other forms of crop or forestry residues could potentially be obtained much cheaper, depending upon the locality, but we will use commercially priced corn stover in our analysis to be conservative. This would allow the production of 100 barrels of oil, which at a price of $60/bbl, would be worth $6000.

However, in addition to the oil product, the system also produces electricity. At the same time that 56 metric tons of $CO_2$ are produced, it also produces 6.8 tons of methane and 2.54 tons of hydrogen. If burned in air, these will produce 200 MWt-hours of energy. Assuming 30% efficiency, this translates into 60 MWe-hours of power, which at a price of $0.10/kWh, would sell for $6000. The power output of the system would be 2.5 MWe, which is well within the range of many portable gas turbine units produced by industry. This output level could be easily absorbed by the grid in rural and small-town America. It may be further noted that the revenue from electricity alone significantly exceeds the cost of feedstock (and other daily costs, outlined below). Therefore, while it might take months before an EOR operation begins to acquire increased oil yield from a given field, the operator of a PRESEOR system will have ongoing revenue from day one from electricity sales exceeding his or her ongoing costs. This greatly reduces the financial risk of undertaking EOR to a small operator, as he or she will not be in the uncomfortable position of paying for fuel feedstock and other operating costs while waiting for increased oil yields to commence.

Adding the $6000 per day revenue from electricity to the $6000 earned from oil, we see that a total gross income of $12,000 per day can be obtained at a cost of $1720 in feedstock. Assuming labor costs for a two-man crew of $800 per day (which could be reduced by having a single two man crew rotate its attention among a number of PRESEOR units deployed within a given region), and capital and depreciation costs of $820 per day (assuming a per unit capital cost of $3 million, paid off at 10% per year), total daily operating costs would be $3340. Thus the net profit of the operation would be $8660 per day, or about $3.2 million per year. This would be highly satisfactory to many small producers.

To address the needs of larger fields, multiple units could be used, with electricity production, oil yields, and profits multiplied accordingly.

Profit could be enhanced further if some of the $CO_2$ used to recover oil can be recaptured and recycled after the oil is brought to the surface. Effective use of such techniques could make many fuels much more expensive than biomass highly attractive for PRESEOR utilization. Also note that in the above example, power is being produced with a net subtraction of $CO_2$ from the Earth's atmosphere. As a result of widespread concern over global warming, proposals are being considered to create taxes on $CO_2$ emissions, with typical figures mentioned in the range of $10/ton $CO_2$ released. Under such a legal regime, the carbon credits would effectively cut the feedstock costs by 43%, further increasing the profitability of the PRESEOR system.

Therefore, using the principles taught by the present invention, profitable EOR may become economically feasible for any oil field, no matter how far it is from existing $CO_2$ sources.

Macroeconomic Impact

Above, the impact of the technology on a single user was discussed, to show that it would be highly profitable. This is the key to the propagation of the technology to a large number of fields. In this section, the macroeconomic effect of the technology is discussed once it has been put into broad use, showing that it could have a major impact in both securing America's oil supply, meeting expanded electricity needs, and reducing carbon emissions.

The DOE has identified 1100 major oil reservoirs containing collectively hundreds of thousands of oil fields that would be amenable to EOR, provided a source of $CO_2$ were available. Currently, only a tiny fraction of these fields can access $CO_2$. The PRESEOR would make $CO_2$ available to all of them. According to DOE, EOR currently provides 4% of U.S. oil production. Once the PRESEOR is available, this fraction could increase dramatically.

Let us consider: With over 100,000 oilfields needing $CO_2$ for EOR, it is reasonable to assume that eventually 10,000 PRESEOR units could be put into operation in the U.S. alone. These would collectively produce 1 million barrels of oil per day, an increase on the order of 15% of the American domestic oil production. Additional units deployed outside the U.S. would add vast additional petroleum reserves to the world's available resources, making the fuel supply of all nations more plentiful and secure. Furthermore, since more $CO_2$ would be sequestered in the process of producing this oil than that released by burning it, the use of such oil would add nothing to global atmospheric $CO_2$ concentrations. This is very important, because as China, India, and other nations industrialize, there may soon be billions of additional automobiles operating around the world. PRESEOR technology distributed internationally will allow them to be fueled without driving climate change.

In addition to providing net carbon emission-free oil, 10,000 American PRESEOR units would also make available 20,000 MWe of renewable carbon emission-free electricity, available as desired, around the clock in the U.S. alone. Still more benefits would accrue as the technology is disseminated internationally.

Thus it can be seen that the deployment of PRESEOR technology according to the principles of the present invention will meet the critical goals of securing America's oil and electricity supplies while reducing carbon emissions both here and around the globe.

Figure 1A:
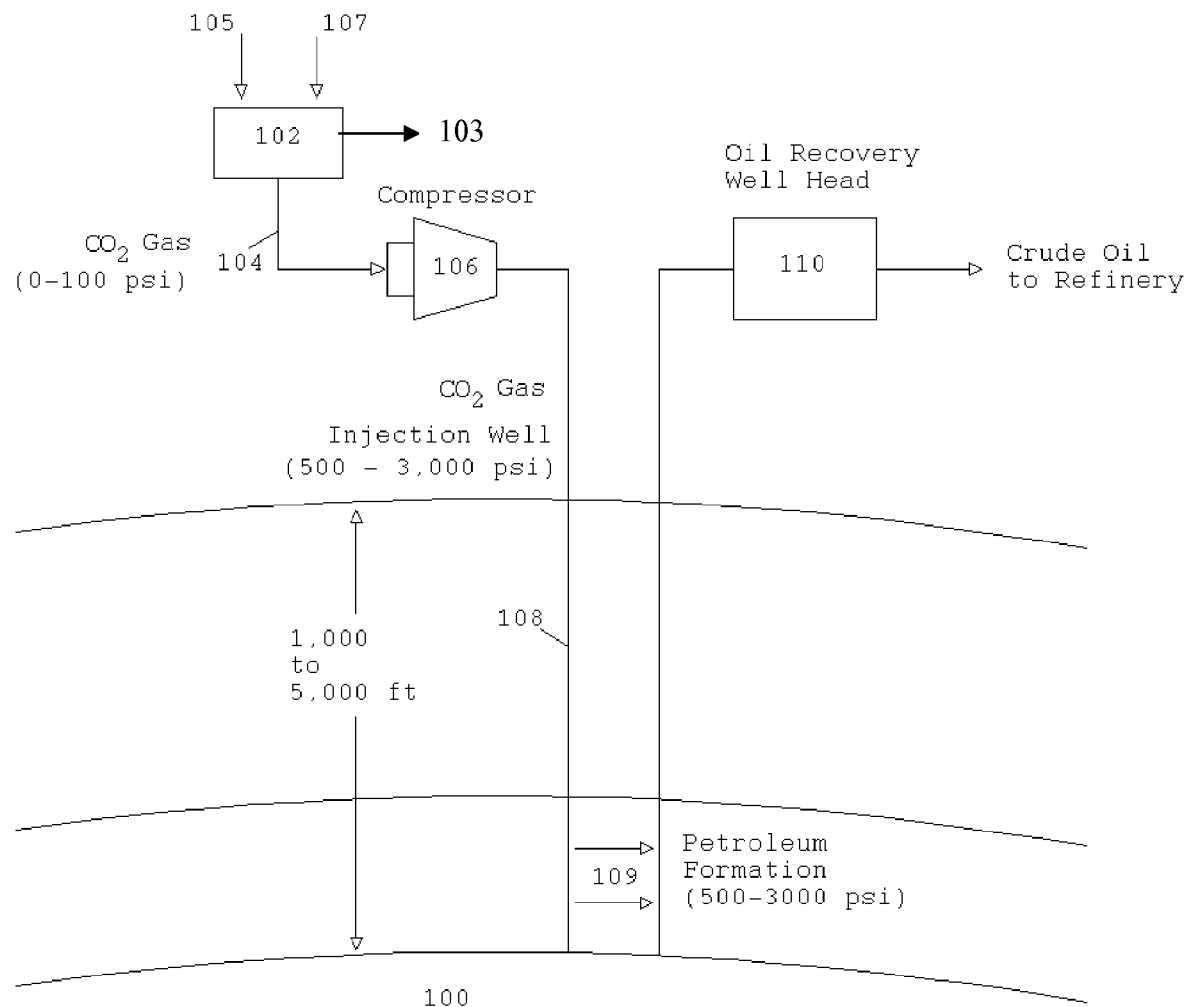
FIG. 1A illustrates an example of an embodiment of the present invention for the extraction of oil from an oil well.

The PRESEOR involves three primary components. These are the steam reformer, the gas separator, and the gas turbine electrical generation system. A block diagram showing the functioning of one embodiment of the PRESEOR is presented in FIG. 1B, while one example of the use of the PRESEOR to extract oil is shown in FIG. 1A.

DETAILED DISCUSSION

Embodiments of the present invention provide for the generation of driver gas that is used for extracting oil from an otherwise depleted oil well, or to drive trapped reservoirs of underground natural gas to the surface. For purposes of the present invention, a driver gas is typically any gas formed during the reforming reactions of the present invention and is preferably a hydrogen-rich gas or hydrogen and carbon dioxide containing gas. Various embodiments of the present invention are disclosed herein. Note that the majority of the disclosure is directed toward creating a driver gas that is ultimately injected into depleted oil wells for the extraction of oil; however, methods and apparatus of the invention can also be used to create driver gases useful in driving trapped natural gas to the surface. As such, it is noted that the scope of the present invention encompasses the use of driver gas created in accordance with the present invention to drive out other materials beyond oil from depleted oil wells, and in particular encompasses using driver gas to drive trapped natural gas out of underground natural gas reservoirs.

In particular, carbon dioxide ($CO_2$) may be injected into depleted oil wells, rendering the oil substantially less viscous and more readily extractable. The $CO_2$ also pressurizes the oil, while the reduced viscosity mobilizes the oil for recovery through fluid drive.

In addition, hydrogen ($H_2$) may also be injected into depleted oil wells. There are various properties of hydrogen that suggest it would be highly useful in tertiary oil recovery if it can be economically produced at the site of the oil well. For instance, hydrogen has an extremely high rate of diffusion and is able to pervade the underground reservoir relatively quickly upon injection. Thus, the hydrogen will cause the oil to swell leading to a subsequent reduction in viscosity. At the same time, hydrogen will pressurize the well by creating an artificial gas cap. The resultant increased pressure renders the oil more amenable to withdrawal from the reservoir. Moreover, unlike water and heavier gases, hydrogen has the ability to invade tight junctions in a petroleum reservoir and thus, to provide a driving force for moving oil from such tight portions of a reservoir.

Another potentially significant advantage of using hydrogen in enhanced oil recovery is its ability to hydrogenate the oil in-situ. Hydrogenation of oil purifies the crude oil while at the same time reducing its viscosity, thus making the oil more prone to tertiary recovery and increasing its value. Generally, the hydrogenation reactions to purify recovered crude oil are carried out following oil recovery. Such processing steps are costly and potentially environmentally harmful. Accordingly, the in-situ hydrogenation of oil reservoirs has an environmental as well as an economic advantage.

In one embodiment of the present invention, pressurized hydrogen and $CO_2$ are injected simultaneously into the well. Carbon dioxide, when combined with hydrogen, will have a greater impact on enhanced oil recovery than $CO_2$ alone. Carbon dioxide, by virtue of dissolving in the crude oil, will decrease the viscosity of the oil, making it more amenable to recovery. Additionally, by permeating the small nooks and crevices in the bedrock, the hydrogen will have greater access to the oil and further reduce its viscosity. Thus, carbon dioxide and hydrogen will have a cooperative and mutually beneficial effect on the oil recovery process. However, it will be appreciated that this invention is not limited to this particular theory of operation.

It is another embodiment of the present invention to inject gases that are miscible in oil into an oil well in order to generate an artificial gas cap, thereby enhancing recovery of the oil. It is yet another embodiment of the present invention to inject a gas mixture composed of hydrogen and other gases so that the gas cap is a mixture composed substantially of hydrogen. It is yet another embodiment of the present invention to inject a gas mixture composed of carbon dioxide and other gases so that the gas cap is a mixture composed substantially of carbon dioxide. It is yet another embodiment of the present invention to inject a gas mixture composed substantially of hydrogen and carbon dioxide so that the gas cap is a mixture composed substantially of hydrogen and carbon dioxide. It is yet another embodiment of the present invention to capture the mixture of gases emerging from the oil well apart from the recovery of crude oil.

In FIG. 1A, an underground oil well 100 (which may be otherwise depleted) is illustrated, having an amount of oil therein, such as a residual amount of oil 109. A portable, self-contained PRESEOR apparatus 102 in accordance with the present invention generates driver gas (shown as arrow 104) that may be pumped into the oil well 100 for extracting the residual oil from the oil well 100. The PRESEOR apparatus also generates electricity, shown as arrow 103. As explained herein, the PRESEOR apparatus 102 may reform or react biomass or derivatives of biomass (shown as arrow 105) with water (shown as arrow 107) to form driver gas which, in one example, is a hydrogen and carbon dioxide gas mixture. The driver gas is then compressed by a compressor 106 into high pressure gas that could be pumped underground via injection line 108, where it could impose pressure on residual underground petroleum 109 sufficient to allow it to be extracted by a nearby oil recovery well head 110 or other like site. As an alternative to using biomass, the reforming fuel source may also include alcohols, olefins, paraffins, ethers, aromatic hydrocarbons, carbonaceous urban trash, coal, and other like materials (or mixtures thereof).

Figure 1B:
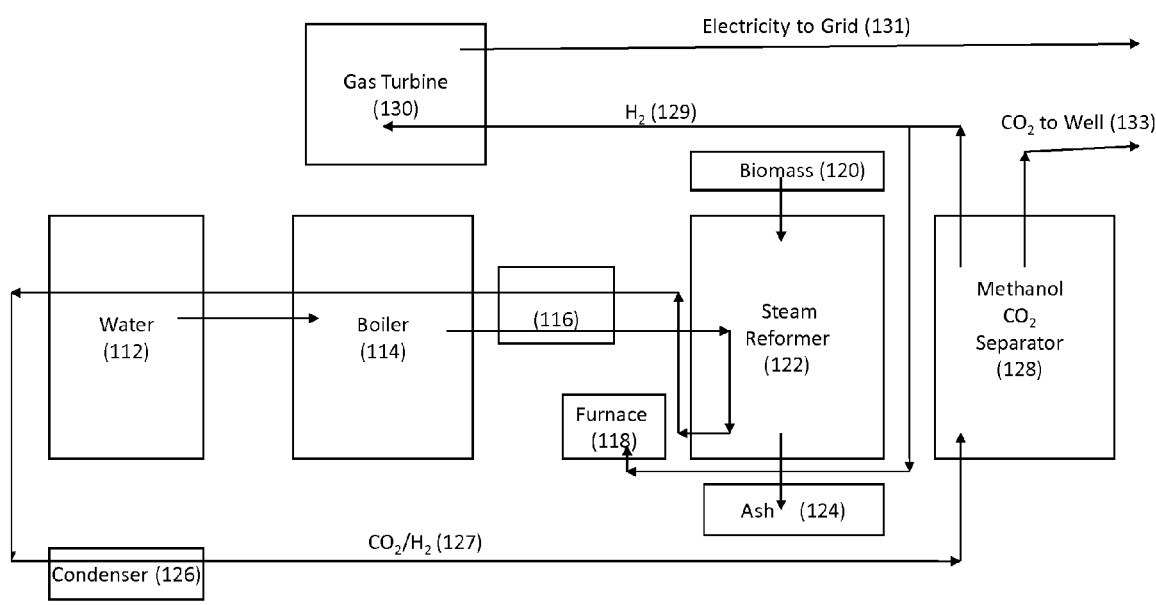
FIG. 1B illustrates a block diagram of a Portable Renewable Energy System for Enhanced Oil Recovery ("PRESEOR") apparatus for extracting oil and/or natural gas from a petroleum reservoir according to one of many embodiments of the present invention.

FIG. 1B shows a block diagram of a preferred embodiment of PRESEOR apparatus 102. Water from water tank 112 enters boiler 114, where it is boiled and brought to 200° C. The steam then passes through heat exchanger 116, where heat from exiting hot driver gas pre-heats the steam and cools the exiting driver gas, increasing the overall efficiency of the system 102. Biomass 120 and hot steam enter steam reformer 122, which operates at approximately 850° C. and 10 bar. Ash is collected in ash tray 124, from the bottom of the steam reformer 122. The heat to drive steam reformer 122 is provided by furnace 118, which is fueled by hydrogen gas. Exiting driver gas passes through heat exchanger 116, pre-heating the steam from boiler 114. The exiting driver gas passes around boiler 114 and water tank 112, further releasing heat to these elements. Finally, exiting driver gas 127 is passed through condenser 126, before being fed to methanol $CO_2$ separator 128, the operation of which is described in greater detail below. The driver gas is composed primarily of carbon dioxide and hydrogen gas, but may also include methane gas and carbon monoxide gas, as well as possibly other gases. The methanol $CO_2$ separator 128 produces a $CO_2$ gas stream 133 comprised essentially of $CO_2$, and a combustion gas stream 129 comprised primarily of hydrogen, but also methane, carbon monoxide, and possibly other gases. The combustion gas stream 129 is fed into gas turbine 130, as well as furnace 118. Gas turbine 130 produces electricity 131, which may be used locally or fed to the grid. Furnace 118 burns a portion of the combustion gas in order to generate the heat necessary to drive the reforming reaction taking place in the steam reformer 122. The $CO_2$ gas stream 133 may be further compressed, and is injected into an injection well as described in relation to FIG. 1A.

The boiler 114 may operate at a temperature of approximately 150° C. to 250° C.

The steam reformer 122 may operate at a temperature of approximately 600° C. to 1000° C., and a pressure of approximately 5 bar to 30 bar. The steam reformer may be a fixed bed reformer, a fluidized bed reformer, or an entrained-flow reformer, or another steam reformer design known in the art.

The methanol $CO_2$ separator 128 may operate in a temperature-swing cycle between approximately −60° C. and +40° C.

The apparatus may also include a control system adapted to control an operation of the apparatus based on a market price of biomass, a market price of electricity, and a market price of crude petroleum (as described in greater detail below).

The carbon dioxide-rich driver gas is preferably at least 90% $CO_2$ by weight, and more preferably at least 99% $CO_2$ by weight.

As described in greater detail in relation to FIG. 10, preferably an amount of carbon dioxide released when the oil is consumed is less than an amount of carbon dioxide injected underground to extract the oil. Also, as described in greater detail in relation to FIG. 10, the electricity generated has substantially less associated carbon dioxide emissions than electricity generated from combustion of natural gas.

Figure 2:
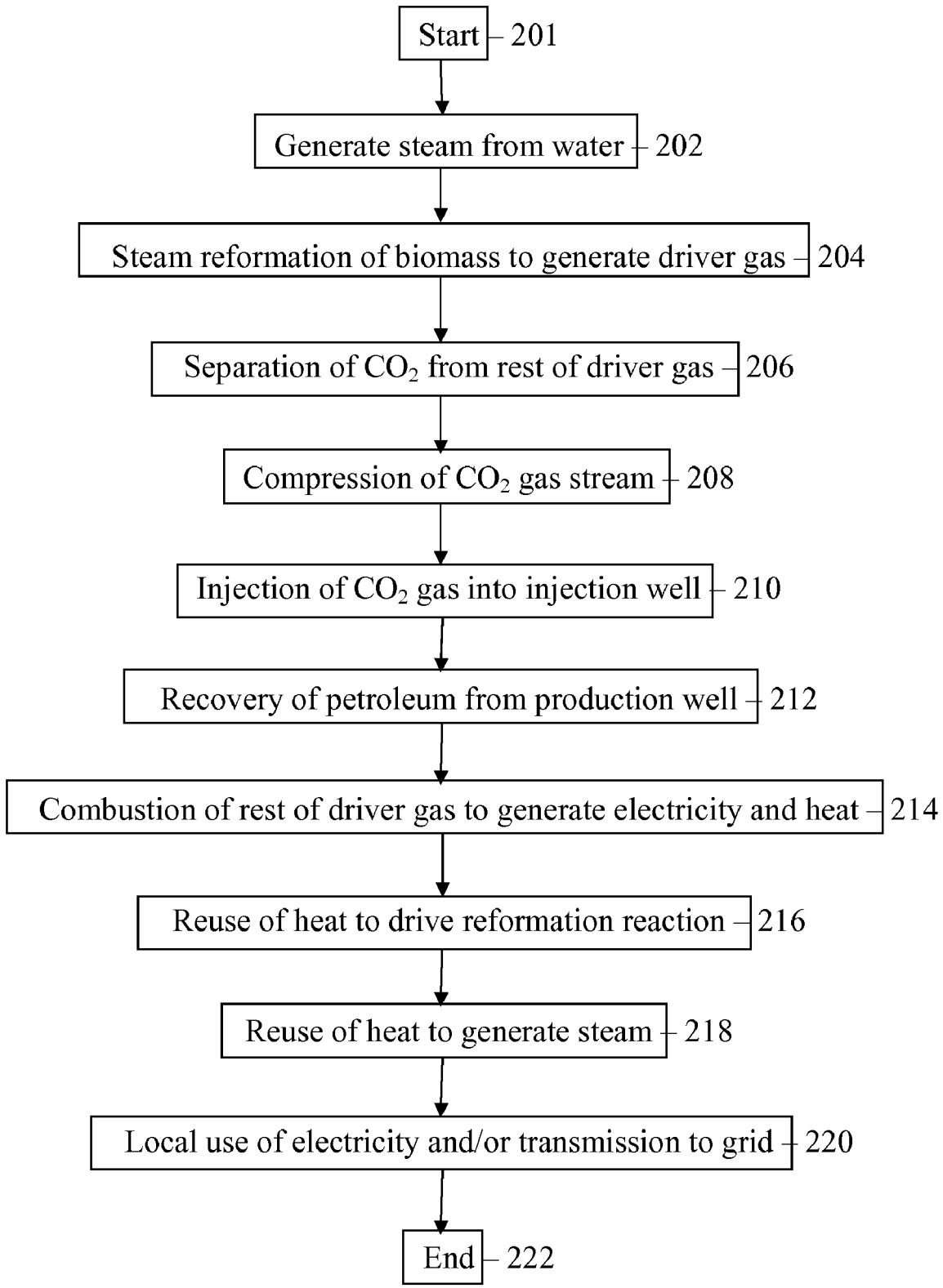
FIG. 2 illustrates an example of operations for extracting oil from an oil well, in accordance with an embodiment of the present invention.

FIG. 2 illustrates an example of operations 200 that may be performed in order to drive petroleum resources out of the ground, such as out of an oil well or a depleted oil well. The process begins at operation 201. At operation 202, steam is generated from biomass, for example, using a boiler. At operation 204, biomass is reformed using steam into driver gas. At operation 206, a portion of the carbon dioxide is separated from the rest of the driver gas. At operation 208, the separated portion of the carbon dioxide is compressed to appropriate pressure, prior to being injected into the oil well at operation 210, in order to drive petroleum out of the ground, as shown in operation 212. For instance, the injected gas may soften highly viscous petroleum residues and displace them, thereby mobilizing such petroleum residues for recovery by conventional means (shown as operation 212).

The rest of the driver gas, which may include hydrogen gas, as well as minor amounts of methane, carbon monoxide, as well as other gases, are combusted in order to generate electricity and heat, as shown in operation 214. In one example, operation 214 may include combustion of hydrogen and small amounts of methane, in order to provide energy, for instance, within a gas turbine. The energy generated from the combustion may be used to heat the biomass to a temperature where the biomass reacts with water to form a hydrogen-rich driver gas, as described in operation 216. Note that the energy used to drive the reforming reaction can also be provided from burning a fuel other than hydrogen, or biomass, or from a non-combustible source, for example, solar energy, nuclear energy, wind energy, grid electricity, or hydroelectric power (not shown in FIG. 2). Some of the heat from the combustion reaction is used to help generate steam in the boiler, as shown in operation 218. Finally, the excess electricity may be used locally or transmitted to the local grid, as shown in operation 220. The process 200 ends in step 222.

Reformer Subsystem

Embodiments of the present invention provide reformer apparatus for generating driver gas used in petroleum extraction, from among other sites, depleted oil wells. Apparatus embodiments of the invention are portable, self-contained, and energy efficient, and are able to generate driver gas through steam reforming of biomass. In some embodiments, the apparatus utilizes a biomass reforming reaction to generate the driver gas and a combustion reaction to provide the energy required to reform biomass and generate the driver gas. Various apparatus embodiments are provided herein based on either separating the reforming reaction from the combustion reaction or based on combining the reforming reaction with the combustion reaction (referred to herein as "autothermal reforming"). In addition, the apparatus typically includes heat exchange elements to facilitate heat transfer from the high temperature driver gas to incoming reformer and/or combustion fuel. The transfer of heat facilitates the reforming reaction and lowers the energy required to complete the driver gas formation. Note that various apparatus configurations are envisioned to be within the scope of the present invention as long as the apparatus provides for on-site, portable, energy efficient biomass reforming reactions (and preferably biomass-steam reforming reactions) that produce driver gas useful in the extraction of petroleum products from an underground source. As such, one illustrative embodiment is described in relation to FIG. 3 for separate reformer and combustion reactions, followed by an embodiment described in relation to FIG. 4 for autothermal biomass reforming and production of driver gas from a single reaction chamber.

The generated driver gases include hydrogen gas and carbon dioxide gas, and may also include other gases, such as methane, carbon monoxide, nitrogen, etc. In one embodiment of the present invention, the hydrogen gas is separated, and used separately from the carbon dioxide. For example, the hydrogen gas may be burned in a gas turbine to generate electricity. Alternatively, the hydrogen gas may be mixed with the carbon dioxide, and used in conjunction with the carbon dioxide for enhanced oil recovery.

A significant advantage of utilizing biomass is the very low cost of biomass in relation to liquid or gaseous fuels. Biomass may be obtained at a typical cost of $40 per ton (approximately 4 cents per kilogram). The present invention may be especially advantageous in locations where biomass is readily and/or cheaply available at or near the site of the oil well.

Although both an indirect (FIG. 3) and an autothermal (FIG. 4) reformer are shown here for completeness, the present invention is best practiced with an indirect reformer (FIG. 3), since in an indirect reformer the driver gas does not have nitrogen from air mixed with the generated hydrogen and carbon dioxide, which aids the separation process (described below).

Indirect Reformer Subsystem

Figure 3:
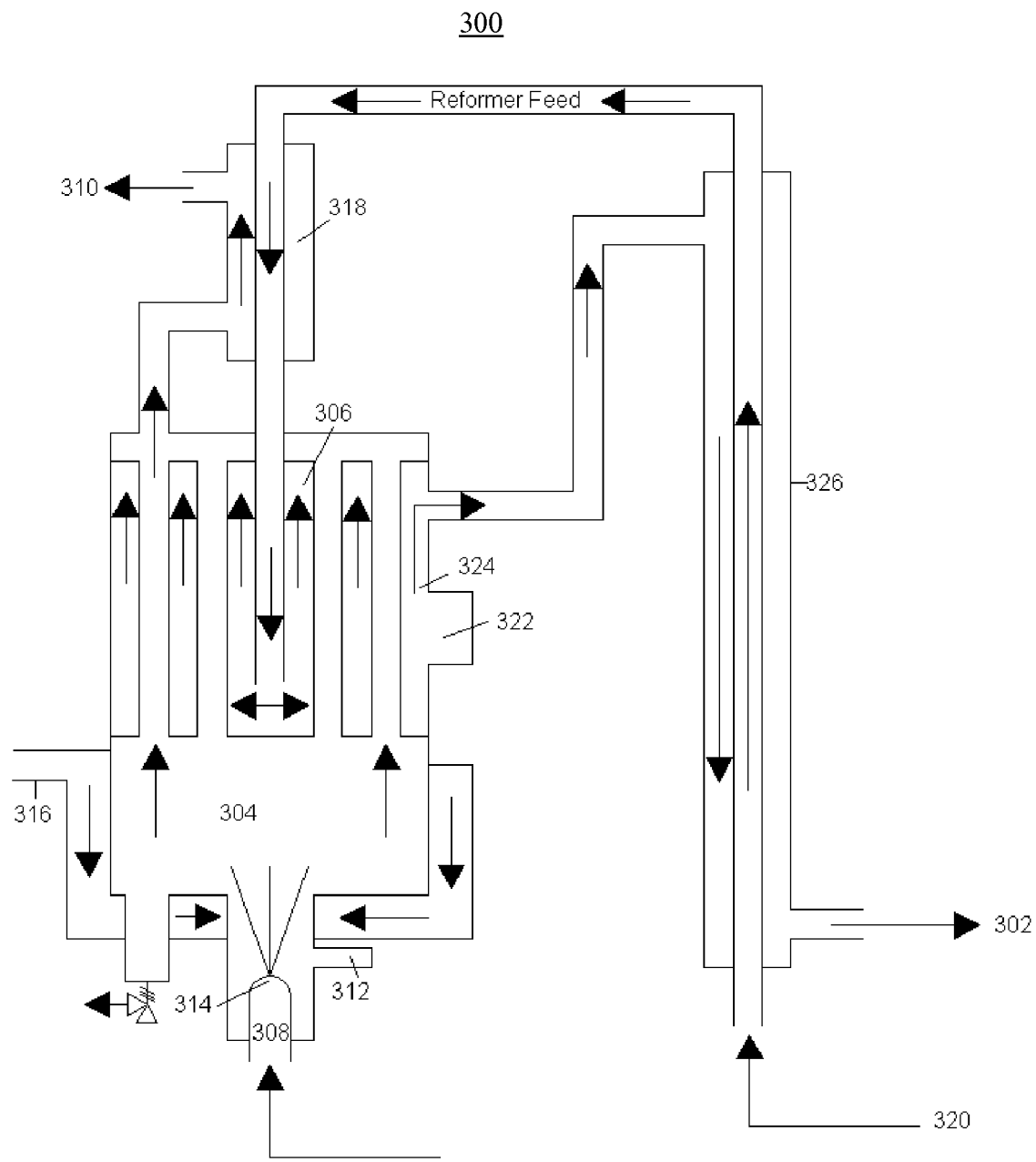
FIG. 3 illustrates an example of an indirect biomass reformer for use with a PRESEOR apparatus for extracting oil from an oil well, in accordance with an embodiment of the present invention.

FIG. 3 illustrates an example of a self-contained, portable apparatus 300 for generating driver gas (shown as arrow 302) for injection into the ground or an oil well, in accordance with one embodiment of the present invention.

In FIG. 3, an embodiment of the apparatus may include a first storage container (not shown) for storing a combustible material, such as biomass, an alcohol, olefin, or other like material. A second storage container (not shown) may also be provided for storing the biomass fuel for the reforming reaction. The water may be mixed with the biomass in this container to form biomass slurry. Alternatively, a third container (not shown) may be used to store water to be reacted with the biomass in the reformer chamber.

In one example, a first chamber 304 has an inlet port 316 and an outlet port 310 and is adapted to provide for the combustion of the combustible material. In one example, the first chamber 304 includes an igniter such as a spark plug 312 or other conventional igniter, and a nozzle 314 coupled with the inlet port 316 of the first chamber 304. The inlet port 316 of the first chamber 304 may be coupled with the first storage container (not shown) so that the contents of the first storage container may be introduced into and combusted within the first chamber 304. The first chamber 304 also includes a port 308 for introducing combustion air into the first chamber 304. The first chamber 304 is also adapted to receive a portion of the second chamber 306, described below, so that the energy/heat from the combustion of the combustible material from the first storage container (not shown) within the first chamber 304 is transferred into a portion of the second chamber 306. The outlet port 310 of the first chamber 304, in one example, is near the inlet port 320 of the second chamber 306, and a heat exchanger 318 is used to allow the combustion exhaust gas to heat the biomass and water entering the second chamber 306. Alternatively, the outlet 310 of the first chamber 306 can feed to a heat exchanger located inside the second chamber 306, which thereby allows the combustion exhaust gases produced in the first chamber 304 to provide the heat to drive the reforming reactions in the second chamber 306.

The second chamber 306 has an inlet port (shown as arrow 320) and an outlet port 302. In one example, the inlet port 320 is coupled with the second and third storage containers (not shown) and receives the contents of the second and third storage containers (not shown).

In one example, the second chamber 306 is positioned within the first chamber 304, such that the combustion heat/energy from the first chamber 304 heats the biomass and water sources contained within the second chamber 306 to a point where the biomass reforms into a driver gas which exists out of the outlet port 302 of the second chamber 306. The first and second chambers may be fluidly isolated.

In one embodiment, shown in FIG. 3, the reformer feed entering the inlet port 320 may be a single fluid, for example biomass-water slurry. In other embodiments, not shown in FIG. 3, the biomass and water may be fed into the reformer chamber through separate inlets.

In one example, a first heat exchanger 318 is coupled with the outlet port 310 of the first chamber 304 (the combustion chamber) and is thermodynamically coupled with a portion of the inlet port of the second chamber 306. In this manner, the hot combustion exhaust gases from the first chamber are used to preheat the biomass and water sources as they are being introduced into the second chamber 306 for reformation into a driver gas.

A second heat exchanger 326 may also be utilized, wherein the second heat exchanger 326 is thermodynamically coupled with the outlet port 302 and the inlet port 320 of the second chamber 306, which provides the dual benefit of preheating the biomass and water sources prior to entry into the second chamber 306, as well as cooling the driver gas which is expelled from the outlet port 302 of the second chamber 306.

Notwithstanding the above examples, the present invention does not require the use of heat exchangers. The use of heat exchangers is optional. Heat exchangers may be used to increase the efficiency of the reformer apparatus. However, there may be situations in which heat exchangers would not be used, such as when hot driver gas is desired and/or when the biomass and water sources are pre-heated.

Autothermal Reformer Subsystem

Figure 4:
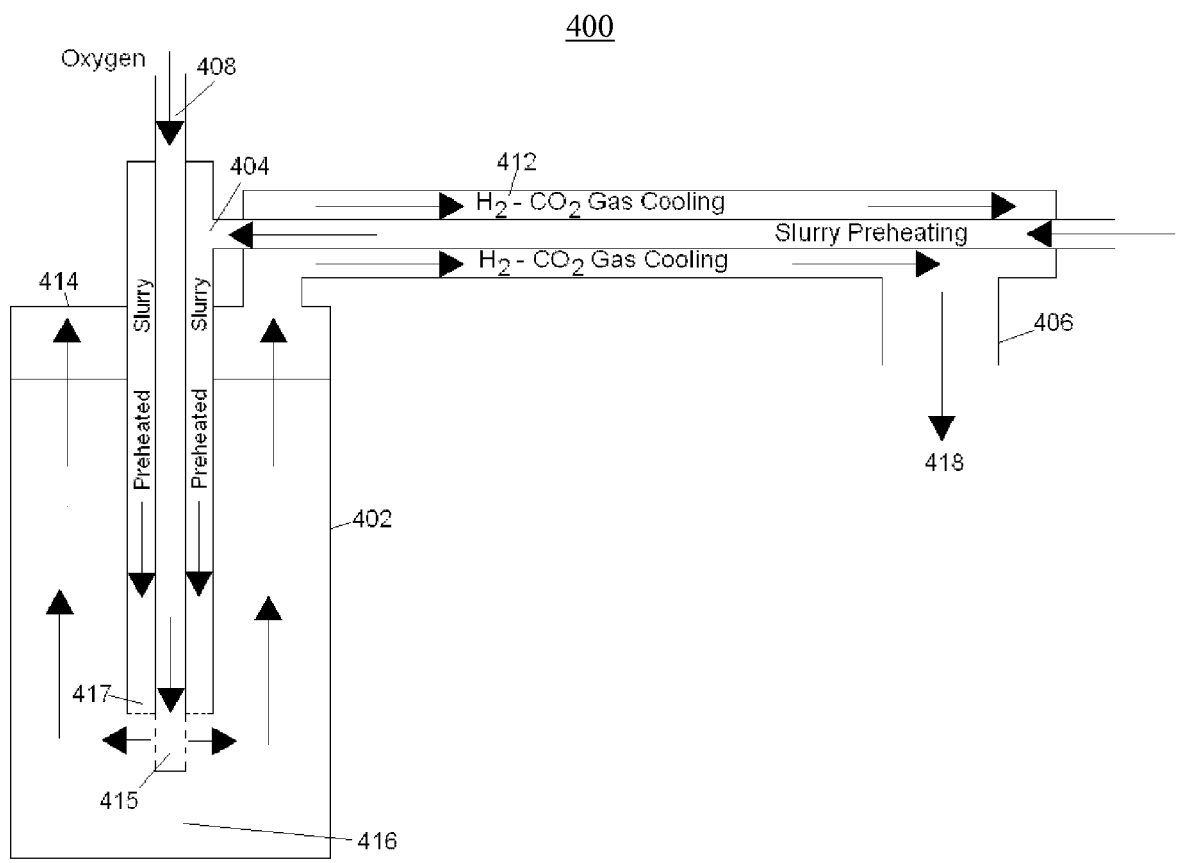
FIG. 4 illustrates an example of an autothermal biomass reformer for use with a PRESEOR apparatus for extracting oil from an oil well, in accordance with an embodiment of the present invention.

FIG. 4 illustrates another example of a self-contained portable apparatus 400 for generating driver gas for injection into the ground or an oil well, in accordance with another embodiment of the present invention. The embodiment illustrated in FIG. 4 provides an "autothermal reformer" for the production of driver gas that is injected into the ground or an oil well (to remove oil or natural gas or other like materials).

An autothermal reformer 400 of the present invention directly reacts a biomass source with water as well as oxygen, air, or other oxidizers in a single chamber 402. Embodiments of the reformer provide an environment for reforming biomass from a feed at proper temperature and pressure resulting in the release of driver gas. Since the reforming reaction is favored by low pressure, in some embodiments, pressure in the autothermal reactor is maintained under 50 bar, and possibly under much lower pressure. Some embodiments of the autothermal reformer may combine counter-flow heat exchange elements to enhance heat transfer and energy efficiency of the autothermal reformer.

FIG. 4 shows one embodiment of the autothermal reformer apparatus 400 of the present invention. Note that other autothermal reformer apparatus are envisioned to be within the scope of the present invention as long as they provide at least a reaction chamber with a biomass source inlet, a water or steam inlet (which may or may not be common with the biomass inlet), an air or oxidizing agent inlet, and a driver gas outlet.

Referring to FIG. 4, an autothermal reformer apparatus 400 is shown having a reaction chamber 402, a biomass-water slurry delivery pipe (fuel pipe) 404 for delivery of a mixture of biomass and water, a driver gas outlet port (outlet port) 406 for release of produced driver gas 418, and an oxygen or other oxidizing gas inlet pipe (gas pipe) 408 for delivery of an oxidizing gas used in the combustion of the biomass in the reaction chamber.

Still referring to FIG. 4, the reaction chamber 402 is of sufficient size and shape for autothermal reforming of biomass. Different chamber geometries can be used as long as they constrain the autothermal reforming reactions and provide sufficient chamber space to produce an amount of driver gas necessary at an oil extraction site. In the embodiment shown in FIG. 4, the fuel pipe 404 is coupled to the outlet port 406 to form a counter-exchange heat exchanger 412 so that the energy/heat from the exiting driver gas is transferred to the biomass-water slurry entering the reaction chamber 402 via the fuel pipe 404. In addition, the fuel pipe 404 typically enters at a first or top end 414 of the reaction chamber 402 and releases the fuel toward the second or bottom end 416 of the reaction chamber 402. This configuration enhances heat release from the heated biomass-water slurry into the contents of the reaction chamber 402. Release of fuel into the reaction chamber 402 can be via an outlet 417 or other like device. The gas pipe 408 is typically coupled to or adjacent to the fuel pipe 404 and releases the oxygen or other oxidizing gas adjacent to the release of the biomass-water slurry 415. Note that other configurations of biomass and water delivery, oxygen or other oxidizing agent delivery, and driver gas release are envisioned to be within the scope of the present invention and are shown in FIG. 4 as an illustration of merely one embodiment. When in use, the reaction chamber of the autothermal reformer apparatus is typically preheated to a temperature sufficient to start the reforming reaction, i.e., approximately 500° C., and preferably above approximately 800° C. Preheating may be accomplished by a reaction chamber integrated heating element, a heating coil, an external combustor heating system, an internal combustion system, or other like device (not shown).

The biomass and water sources are fed into the reaction chamber 402 via the fuel pipe 404. Note that once driver gas is produced in the reaction chamber 402, the biomass-water slurry is heated prior to delivery into the reaction chamber 402 by the exiting driver gas (shown as arrow 418) via the counter-flow heat exchanger 412. At approximately the same time that the biomass-water slurry is being delivered to the reaction chamber 402, the oxygen or other oxidizing agent is being delivered to the reaction chamber via the inlet pipe 408. Various reformer chemical reactions are described below.

Once the reforming reaction has been established within the reaction chamber 402, the reaction-chamber heating element may be shut off to conserve energy. Note also that the amount of water combined into the biomass slurry can be adjusted to control the reforming temperatures.

While the example shown in FIG. 4 depicts biomass and water being fed into the reactor together in the form of biomass-water slurry, this is illustrative of only one embodiment. In other embodiments, shown in FIG. 5 and FIG. 6, biomass and water may be fed into the reaction chamber through separate inlets. Also, in other embodiments, not shown, additional combustible material, such as natural gas, oil, or any other fuel may be fed into the reaction chamber (in addition to the biomass) in order to facilitate initial system start-up or reactor temperature maintenance. The use of such additional fuel(s) may also be used to provide additional reforming reaction material or to change the hydrogen/carbon dioxide output ratio of the system. All such embodiments are envisioned to be within the scope of the present invention.

Again, although both an indirect (FIG. 3) and an autothermal (FIG. 4) reformer are shown here for completeness, the present invention is best practiced with an indirect reformer (FIG. 3), since in an indirect reformer the driver gas does not have nitrogen from air mixed with the generated hydrogen and carbon dioxide, which aids the separation process (described below).

Alternative Chemical Processes

Embodiments of the present invention provide processes for producing driver gas from the reforming of biomass or derivatives of biomass (as described above). In alternative embodiments, other fuel sources, such as liquid and/or gaseous hydrocarbons, alcohols, olefins, paraffins, ethers, and other like materials may be used, either together with biomass or as an alternative to biomass. Examples of other fuel sources that may be used in the reforming reaction include, but are not limited to, methanol, ethanol, propane, propylene, toluene, octane, diesel, gasoline, crude oil, natural gas, or coal. A similar reformer apparatus may be used to reform these other fuels. Such alternative fuel sources may also be used in place of biomass in the combustion reactions of the present invention in order to provide the heat necessary to drive the reforming reaction.

The methods of the present invention use easily obtained fuel sources such as biomass, water, and atmospheric air. One advantage of utilizing biomass, such as forestry residue, as the primary fuel feedstock is the relative low price of biomass and the general availability of biomass as compared to many liquid and gaseous fuels, as well as the environmental benefits of using biomass over coal.

In more detail, the present invention provides reforming processes of biomass or biomass-derivatives to generate, for example, $H_2$, $CO_2$, and other gases. The biomass reforming reactions of the present invention are endothermic, requiring an input of energy to drive the reaction toward biomass reformation.

In one embodiment, the energy required to drive the biomass reforming reaction is provided through the combustion of any combustible material, for example biomass, an alcohol, a refined petroleum product, crude petroleum, natural gas, or coal that provides the necessary heat to drive the endothermic steam reforming reaction. A much larger number of product molecules is produced than is burned or reacted, allowing a much larger amount of fuel to be driven out of the ground than must be used to obtain it.

In other embodiments, the energy required to drive the reforming reaction is provided via any non-combustible source sufficient to generate enough heat to drive the reforming reaction to substantial completion. Examples of non-combustible sources include solar, nuclear, wind, grid electricity, or hydroelectric power.

The present combination of reforming and combustion reactions may be performed within a portable reaction vessel, for example the devices described herein (see FIG. 3 and FIG. 4). This is in contrast to electrolytic hydrogen gas formation, which requires large amounts of electrical power and nonportable machinery for the generation of the driver gas.

Reactions 1-6 above provided illustrative processes for reforming biomass to produce driver gas used in the recovery of oil or other like materials. As an alternative to using biomass as the fuel source for the reforming reaction, various other fuels, such as alcohols, petroleum, natural gas, etc. may be used as the fuel source for the reforming reaction. Reactions 7-13 illustrate several other reforming reactions using alternative fuel sources that are also in accordance with the present invention. The following reactions illustrate a separation of the reforming and combustion reactions; however, as shown in FIG. 4 and discussed in greater detail below, an autothermal reforming reaction may be accomplished by directly reacting the biomass with oxygen in a single reaction chamber.

$$\text{Coal:} C + 2H_2O \rightarrow CO_2 + 2H_2 \quad (7)$$

$$\text{Methane:} CH_4 + 2H_2O \rightarrow CO_2 + 4H_2 \quad (8)$$

$$\text{Ethanol:} C_2H_5OH + 3H_2O \rightarrow 2CO_2 + 6H_2 \quad (9)$$

$$\text{Propane:} C_3H_8 + 6H_2O \rightarrow 3CO_2 + 10H_2 \quad (10)$$

$$\text{Propylene:} C_3H_6 + 6H_2O \rightarrow 3CO_2 + 9H_2 \quad (11)$$

$$\text{Toluene:} C_7H_8 + 14H_2O \rightarrow 7CO_2 + 18H_2 \quad (12)$$

$$\text{Octane:} C_8H_{18} + 16H_2O \rightarrow 8CO_2 + 25H_2 \quad (13)$$

In alternative embodiments, olefins, paraffins, aromatics (as found in crude petroleum), or crude petroleum itself may be used as the reforming reaction fuel source.

Biomass Reforming Subsystem Options

Biomass and steam may be reformed to generate carbon dioxide and hydrogen driver gas. Biomass molecules contain carbon and hydrogen with varying amounts of sulfur, nitrogen, and oxygen. Thus, in order to utilize biomass, some processing steps are needed to handle solid feeds and the presence of sulfur contaminants.

The present invention provides for at least three possible biomass-steam reformers, but is not limited to the three biomass reformers described here. These include the fixed-bed reformer (FIG. 5), the fluidized-bed reformer (FIG. 6), and the entrained-flow reformer (not illustrated). The biomass reformers increase in complexity in the order listed. The solids-residue handling requirements also increase in complexity in the same order. However, reaction rates also increase in the same order, leading to reduced equipment sizes for a given throughput. Each biomass-steam reformer may be implemented as an indirect reformer configuration (as shown in FIG. 3), or as an autothermal reformer configuration (as shown in FIG. 4).

Table 1 shows important features that distinguish the three possible biomass-steam reformers. Values are shown to illustrate relative differences in the reformer parameters.

TABLE 1

Operating parameters of various biomass-steam reformers

| Operating Parameter | Fixed-Bed Reformer (FIG. 5) | Fluidized-Bed Reformer (FIG. 6) | Entrained-Flow Reformer (not illustrated) |
|---|---|---|---|
| Feed Particle Size | approx. <1" | approx. <¼" | approx. <0.1" |
| Temperature | approx. >700° C. | approx. >800° C. | approx. >1,200° C. |
| Solids Retention Time | greatest | intermediate | shortest |
| Gas Retention Time | longest | shorter | shortest |

All three biomass-steam reformers operate at sufficient temperature to eliminate catalyst requirements for steam reforming. The fixed-bed and fluidized-bed reformers are able to accept biomass of the delivered particle size. The entrained-flow reformer would require additional grinding or pulverizing of the biomass after delivery to the oil site.

Figure 5:
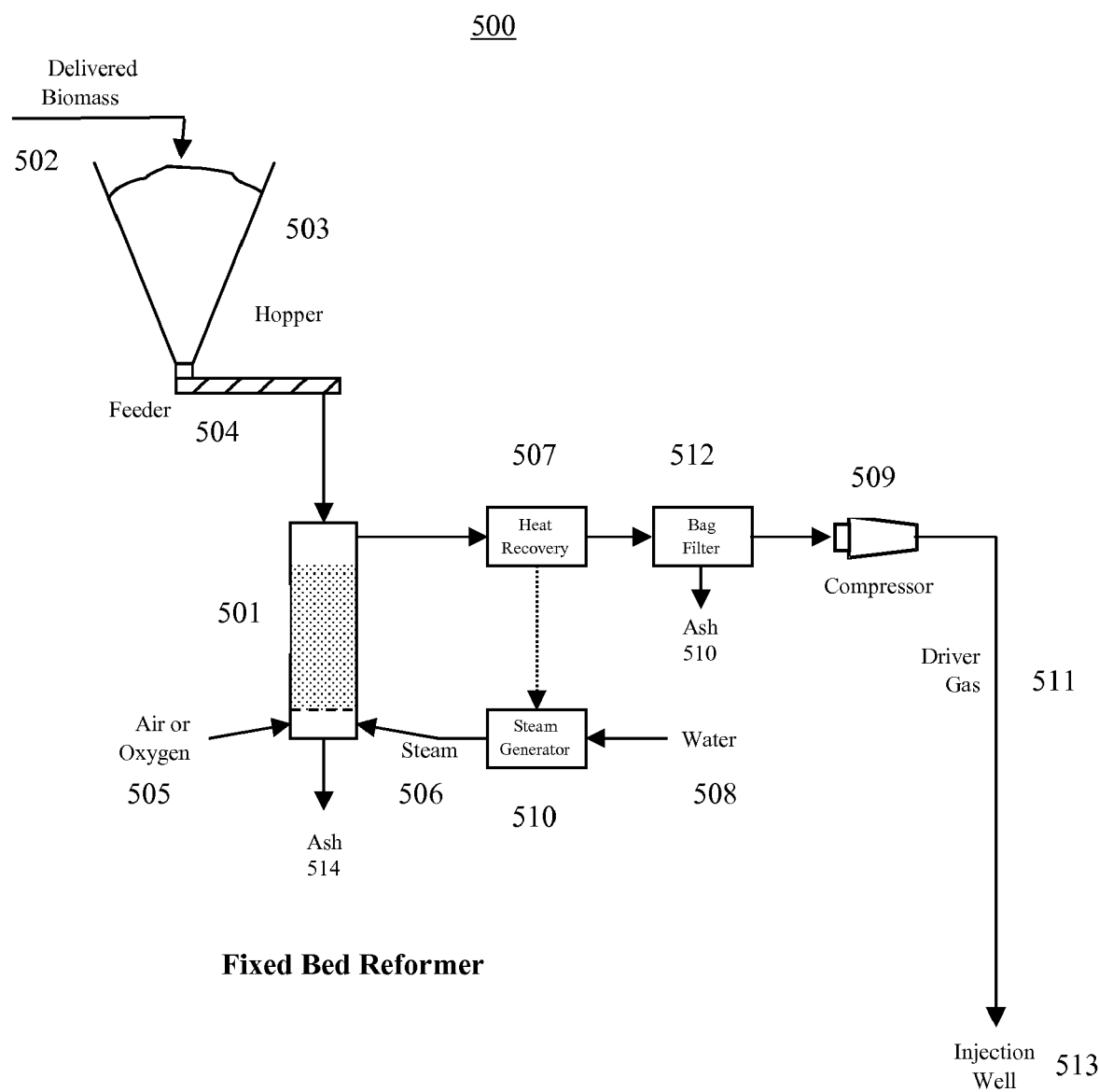
FIG. 5 illustrates an example of a fixed-bed biomass-steam reformer for extracting oil from an oil well, in accordance with an embodiment of the present invention.

In one embodiment of the present invention 500, depicted in FIG. 5, a portable self-contained fixed-bed biomass-steam reformer 501 is used to generate driver gas for injection into the ground of an oil well. In the reaction chamber of the fixed-bed reformer, nearly all the feed and residue particles remain in reaction chamber 501 during reforming. Delivered biomass 502 with a feed particle size of approximately less than 1-inch is introduced into hopper 503. The biomass 502 is then fed into fixed-bed reformer 501 through feeder 504. Combustion air or oxygen (shown as arrow 505) and steam (shown as arrow 506) are also fed into the fixed-bed reformer 501. In one embodiment, heat recovered from the reformer gas is directed into heat recovery unit 507. The heat can be sent to steam generator 510 to convert water (shown as arrow 508) into steam (shown as arrow 506). Alternatively, the heat can be used to generate electrical or mechanical power to drive compressor 509 or other hardware at the oil site.

The fixed-bed reformer can be fed and discharged in batch mode, semi-batch mode (incremental feeding and discharging of ash), or continuous mode. In the fixed-bed reformer, the coarse ash 514 remaining after steam reforming is largely handled in the form of coarser particles that can be removed from the bottom of the reactor. Smaller amounts of ash are entrained in the low velocity exhaust gas exiting the reformer. This fine ash 510 is removed through bag filter 512. Subsequently, the purified driver gas is pressurized in compressor 509 to generate pressurized driver gas (shown as arrow 511) that is injected into injection well 513.

Figure 6:
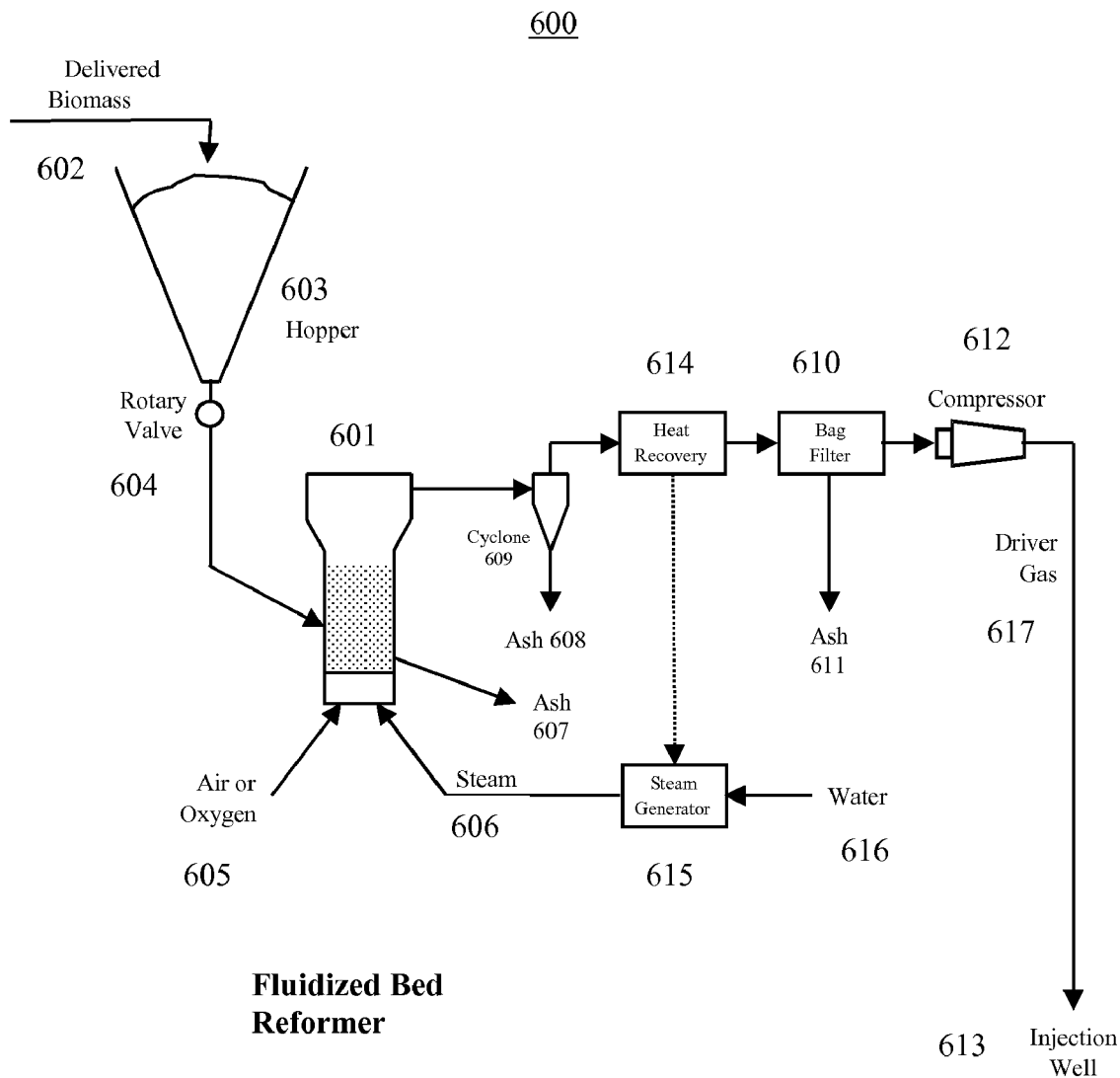
FIG. 6 illustrates an example of a fluidized-bed biomass-steam reformer for extracting oil from an oil well, in accordance with an embodiment of the present invention.

In an alternative embodiment 600, depicted in FIG. 6, a portable fluidized-bed reformer 601 is used to generate driver gas for injection into the ground of an oil well. In the fluidized-bed reformer 601, most particles remain in the reaction chamber, but finer particles are entrained with the exhaust gas. That is, compared to the fixed-bed reformer 501 of FIG. 5, greater amounts of fine particles are entrained in the higher velocity exhaust gas (relative to the exhaust gas generated in the fixed-bed reformer) and must be removed prior to compression of the driver gas. The coarsest of the entrained particles are removed from the gas stream and can be recycled to the reformer or discharged as residue. The remaining finest particles are removed by filtration.

FIG. 6 illustrates an example of an embodiment of an oil recovery system utilizing the fluidized-bed reformer 601. Delivered biomass 602 with a feed particle size of approximately less than ¼-inch is introduced into hopper 603. The biomass is fed into fluidized-bed reformer 601 upon opening of the rotary valve 604. In the fluidized-bed reformer, combustion air or oxygen (shown as arrow 605) and steam (shown as arrow 606) are also fed into the reaction chamber. It is noted that in the fluidized-bed reformer 601, continuous feeding with semi-continuous discharge of coarser ash 607 is preferable. Intermediate ash 608 in exhaust gas exiting the fluidized-bed reformer 601 is removed by cyclone separator 609 (to remove intermediate-sized particles) and bag filter 610 (to remove the finest particles of ash 611) prior to pressurization of the driver gas 617 in compressor 612 and injection into injection well 613. The intermediate-sized particles separated by cyclone 609 can be recycled to the fluidized-bed reformer 601 or removed as residue, depending on the extent of their conversion during reforming. In one embodiment of the fluidized-bed reformer 601, exhaust gas existing cyclone 609 enters heat recovery unit 614. The heat can be sent to steam generator 615 to convert water (shown as arrow 616) into steam (shown as arrow 606). Alternatively, heat recovered from the reformer 601 can be used to generate mechanical power to drive compressor 612 or other hardware at the oil site.

In another embodiment of the present invention (not illustrated), a portable, entrained-flow reformer is used rather than a fixed-bed or fluidized-bed reformer. In an entrained-flow reformer, virtually all particles are removed with the exhaust gas steam exiting the reformer. The feed particle size using the entrained-flow reformer is generally less than approximately 0.1-inch. Compared to the fixed-bed and fluidized-bed reformers, the entrained-flow reformer would require additional grinding or pulverizing of the biomass after delivery to the oil site. Furthermore, with the entrained-flow reformer, the entire feed stream is entrained and removed from the reaction chamber at high velocity. Cyclone and filtration hardware similar to those of the fluidized-bed reformer are used, but removal capacities must be greater.

In other embodiments of the present invention, (not illustrated in FIG. 5 or FIG. 6) a biomass-water slurry may be used to provide both biomass and water into the reformer in liquid form via a single feed system, as shown in FIG. 3 and FIG. 4.

In all biomass-steam reformers described, the reformers operate at sufficient temperature to eliminate catalyst requirements for steam reforming. Generally, the fixed-bed reformer may operate at temperatures above approximately 700° C., while the fluidized-bed reformer may operate at temperatures above approximately 800° C. The entrained-flow reformer may operate at temperatures in excess of approximately 1,200° C. These temperature ranges are illustrative only, and are not intended to limit the scope of the present invention. All biomass-steam reformers may operate over temperature ranges other than those temperature ranges disclosed here.

The fixed-bed reformer 501 of FIG. 5 and fluidized bed reformer 601 of FIG. 6 may be designed as illustrated in FIG. 3 or FIG. 4. That is, the steam reforming of biomass can be carried out using an indirect reformer, as in FIG. 3, or a direct ("autothermal") reformer, as depicted in FIG. 4. Indirect reforming requires heat exchange between the heat source (biomass combustion, for example) and the reformer. Driver gas produced from indirect steam reforming results in a greater hydrogen:carbon dioxide ratio than driver gas produced from direct ("autothermal") reforming. It will be appreciated that the combustible material may be biomass, or alternatively may be an alcohol, olefin, natural gas, oil, coal, or other combustible source.

Autothermal reforming eliminates the heat exchange requirement since partial combustion is performed in the reforming reaction chamber to generate heat. Using oxygen for the oxidizer, the autothermal reformer product gas is still a mixture of carbon dioxide and hydrogen, but the hydrogen:carbon dioxide ratio is lower than that for indirect reforming. Using air as the oxidizer, the autothermal reformer product gas is diluted with nitrogen, which may be undesirable in cases where high purity $CO_2$ is required.

Illustrative biomass reformers have been described and shown here. However, the present invention is not limited to these biomass reformer configurations, and other biomass reformers are within the scope of the present invention.

Sulfur Removal

Biomass has much lower sulfur content than coal. Biomass is also less refractory than coal. Because steam reforming of biomass is performed without catalyst, reforming catalyst poisoning by sulfur compounds is not an issue. In cases where a low-sulfur biomass feed is used, sulfur clean up of the exhaust gas may not be required at all. In the event of potential issues with corrosion caused by sulfur-containing gases in combination with any residual moisture, several sulfur treatment and removal methods are possible.

Dry sorbents may be used to capture sulfur in the exhaust gas. Calcium oxide, magnesium oxide, and sodium carbonate are example dry sorbents that are capable of trapping sulfur gases in solid form (as sulfates or sulfites, depending on the relative oxidation conditions). When the operating temperature and pressure permit effective sulfur capture, sorbent can be added in a coarse form with the biomass feed to fixed- or fluidized-bed reformer configurations. The resulting sulfur-containing product can then be removed from the reaction chamber with the ash remaining after reforming. Alternatively, a finer sorbent can be injected into the gas downstream of the reactor. Sulfur containing solids can then be collected in the cyclone or bag filter. For the entrained-flow reformer configuration, a sorbent will likely perform better by injection into partially cooled gas downstream of the reformer.

In large-capacity reformer configurations, a dry sorbent may be injected in a separate unit downstream of the final ash particulate filter. The sulfur product can then be collected separately in another filter and can potentially be sold as a product for additional revenue.

In other embodiments, sulfur may also be removed by using a wet scrubber sub-system. Wet scrubbers can be configured in venturi, packed-column, or tray-type systems in which the cooled gases are contacted with a scrubbing solution or slurry. The resulting scrubber solution or slurry must then be disposed.

The use of the methanol $CO_2$ separation system described below has the additional benefit of removing sulfur impurities from the $CO_2$ gas stream.

Preferred $CO_2$ Separator Subsystem

According to the present invention, a portable, highly economic $CO_2$ and $H_2$ generation system is created which enables enhanced oil recovery to be conducted wherever the candidate oil field may be. The $CO_2$ and $H_2$ are generated from biomass, a highly economical fuel source and one that is available almost everywhere. The $CO_2$ generated in the present invention may be injected into an oil well for enhanced oil recovery. The present invention also generates large supplies of hydrogen, which may be used to enhance underground oil recovery in a similar fashion to $CO_2$ (as described above), or alternatively split off from the $CO_2$ product to be used for other purposes, including electrical power generation or petrochemical hydrogenation. Depending upon factors such as the particular composition of the underground oil, as well as the local cost of electrical power, the user of the present invention may find it advantageous to use the hydrogen in different proportions for these various purposes.

Hydrogen gas may be mixed with the carbon dioxide gas and injected into the oil well. Alternatively, the hydrogen may be separated from the carbon dioxide. The hydrogen gas may be injected into the oil well, followed by injection of the carbon dioxide gas. Alternatively, the carbon dioxide gas may be injected first, followed by injection of the hydrogen gas.

In an alternative embodiment, the hydrogen gas may be sold to the petrochemical or other industry. In the future, it may also be sold as a fuel for hydrogen-electric cars. Alternatively, the hydrogen may be burned, using for example a gas turbine, to generate electricity. The electricity may be used to provide power for various operations of the oil site. Alternatively, the electricity may be sold to utility companies by feeding the electricity into the electric grid.

Carbon dioxide is approximately two orders of magnitude more soluble in methanol than any of methane, hydrogen, nitrogen, oxygen, or carbon monoxide (which all have solubilities of the same order). The methanol also acts as a trap, removing sulfur impurities from the gas stream. In experiments done to date, inventors have shown that at 10 bar pressure and 10° C., methanol will take in to solution about 40 grams per liter of $CO_2$ from a 40% $CO_2$/60% $N_2$ gas mixture, with less than 2 grams/liter of $N_2$ entrained.

Inventors have used this data to create a system where liquid methanol is pumped in a cycle from 1 bar to 10 bar, with the gas mix being bubbled through a column on the 10 bar side, and captured gas allowed to outgas from solution on the 1 bar side. Results to date show that product gas purities of 95% $CO_2$ can be obtained, with 80% of the input $CO_2$ in the feed gas stream being captured into the product stream. The fraction captured could be increased further to better than 95% by heating the methanol in the low pressure tank to 40° C., which could be readily done using low quality waste heat from either the steam reformer or power generation systems. Warming the methanol in this manner would increase the methanol vapor pressure in the exhaust to about 0.3 bar, but nearly all of the entrained methanol vapor could be condensed and removed by running a low-cost (commercial meat freezer technology) −18° C. refrigerator downstream of the exhaust vessel. This unit would also reduce the $CO_2$ temperature to −18° C., which is advantageous, as it allows $CO_2$ gas to be liquefied by subsequent compression to only 20 bar.

However, in order to eliminate the large majority of this compression energy work, reduce methanol recirculation pump work by an order of magnitude, and to obtain both $CO_2$ product recoveries and purities of better than 97%, a preferred system configuration may be used that uses methanol cooled to −60° C. in the absorption column. Such a column can acquire $CO_2$ in the liquid phase, forming mixtures that are more than 30% $CO_2$ by weight, with only insignificant qualities of non-$CO_2$ gases brought into solution. Upon being warmed in the desorption column to 40° C., nearly all the $CO_2$ is stripped, and removed from the system at 10 bar, making subsequent liquefaction very straightforward. In the preferred embodiment, the heating of the methanol occurs at the bottom of the downflowing desorption column, with cold $CO_2$-saturated methanol on top, so that very little methanol vapor escapes with the product $CO_2$.

In the process of liquefaction, nearly pure $CO_2$ is obtained, as neither hydrogen, methane, oxygen, nitrogen, nor carbon monoxide will be liquefied at −60° C. Once the $CO_2$ is liquefied, it can be brought to whatever high pressure is required for underground injection at little energy cost.

The non-$CO_2$ product gases, which will be a mixture of hydrogen, methane, and small amounts of carbon monoxide, is sent directly to a gas turbine where it is burned to produce electricity for sale to the grid.

Alternative Carbon Dioxide Gas Separation Subsystems

Various alternative techniques may be used to separate hydrogen gas from carbon dioxide gas, in additional to the methanol-$CO_2$ separation technique described above. In one embodiment, hydrogen-carbon dioxide separation may be performed using membranes. The membranes separate molecules based on their relative permeability through various materials that may include polymers, metals, and metal oxides. The membranes are fed at elevated pressure. The permeate is collected at lower pressure while the retentate is collected at a pressure close to the feed pressure.

A membrane separation technique that may operate in conjunction with reactions at elevated temperature is the palladium membrane. This membrane, which may be fabricated using palladium alone or in combination with modifiers, allows only hydrogen to permeate. This type of membrane when operated in a catalytic reactor, such as in a steam reformer, enhances yield by removing a reaction product from the reaction zone. Some variants are capable of operation at up to 900° C.

Another membrane separation method that may be used is a high-temperature polymer membrane. This type of membrane is directed toward $CO_2$ separation and recovery. A polymeric-metal membrane of this type can operate at up to 370° C. (versus typical maximum polymer membrane temperatures of about 150° C.), thus potentially improving process energy efficiency by eliminating a pre-cooling step.

In yet another embodiment, carbon dioxide may be separated from hydrogen by scrubbing in an amine solution. This technique may be used to remove carbon dioxide (and hydrogen sulfide) from the driver gas and may also be used for $CO_2$ recovery from flue gas from the combustion reaction.

Finally, in yet another embodiment, regenerable sorbents may be used to separate hydrogen gas from carbon dioxide gas. In one example of a low-cost regenerable sorption method, a sodium carbonate sorbent is used. The sodium carbonate sorbent operates cyclically, by absorbing at about 60° C. and regenerating at about 120° C.

As described in the preferred $CO_2$ separator section, processes that generate high $CO_2$ concentrations are more amenable to affordable gas separation. Elimination of diluents such as nitrogen from air greatly improves $CO_2$ capture efficiency. In addition, processes that produce $CO_2$ at elevated pressure are at an advantage for the pressure-based separation techniques.

Various gas separator modules may be used, and the present invention is not limited to the particular gas separators shown or described herein, so long as the gas separators perform at least the function of separating $CO_2$ from the rest of the driver gas.

Modular Configuration

The present invention may also be configured as a modular system, which may include all or part of the following set of components: a chassis, a biomass reactor (a biomass reformer, a biomass combustor, a biomass gasifier, or a biomass gasification combined cycle), a gas separator, a compressor, heat exchangers, a power generator, a control system, and a gas capture sub-system. These components may be mixed and matched depending on the particular application, the requirements of a particular user, or the conditions of a particular oil field. These components are described in detail throughout this disclosure, and in particular in greater detail below.

A chassis for supporting the sub-systems is provided. The chassis may be attached to an appropriate method of transportation, such as a truck, boat, or aircraft. The chassis, carrying the various modules, may be mounted or carried upon any number of different vehicles. The chassis may have one or more wheels, or it may have no wheels and may instead rely on the wheels of the vehicle. This configuration makes the system highly portable, and allows it to be easily transported to the location of any oil well, including offshore and remote wells.

Some sample chassis designs for surface transportation are described in U.S. Pat. No. 3,614,153 to Tantlinger et al. and U.S. Pat. No. 3,374,010 to Crockett et al. Various chassis configurations are possible, and the present invention is not limited to the chassis configuration and design illustrated here. For example, a different chassis design and configuration may be used for a chassis designed to be carried by an airplane (not shown) and a different design yet may be used for a chassis designed to be carried by a boat (not shown).

A biomass reformer module is provided that is capable of reacting biomass with water to produce a mixture of $CO_2$ and hydrogen gas, sized to an output rate appropriate for enhanced oil recovery operations. Depending upon the availability and cost of local biomass types, the reformer may be designed to operate with various candidate biomass feed stocks. The biomass reformer may be designed as a fixed-bed reformer, a fluidized-bed reformer, an entrained-flow reformer, or another design altogether. The biomass reformer may be designed in a direct reforming configuration, or an indirect ("autothermal") reforming configuration. Examples of the design of such biomass reformers are discussed above in relation to FIGS. 3-6.

Alternatively, in place of a biomass reformer module, a biomass combustion module may be provided which combusts the biomass either with air, compressed air, or with separated pure oxygen.

Alternatively, in place of a biomass reformer module, a biomass gasifier, or a biomass gasification combined cycle module, may be provided which gasifies biomass either in air, compressed air, or with separated pure oxygen.

A set of heat exchangers is provided that are designed to maximize the thermal efficiency of the reformer system. The heat exchangers were discussed above in relation with the fuel reformers of FIGS. 3 and 4.

A gas separator module is provided that is capable of separating the $CO_2$ from the hydrogen gas. This module gives an operator of the present invention a choice of how much hydrogen to send underground with the $CO_2$, and how much to retain for surface utilization. Candidate separator systems include methanol temperature and/or pressure swing, sorption beds, $CO_2$ freezers, membranes, and centrifugal separators, as described above.

A compressor module is provided that is capable of compressing the driver gas to a pressure appropriate for oil recovery. The compressor is capable of sending the $CO_2$ as well as a portion of the hydrogen intended for underground use, deep into the well for use in oil extraction. The compressor may be effectively explosion proof. This can be accomplished by using an explosion-proof pump, or alternatively by housing a pump that is not rated explosion-proof within a container that provides an inert environment.

A power generator module is provided that is capable of utilizing the hydrogen product separated by the gas separator to generate electricity. The power generator may be a gas turbine, an internal combustion engine, a fuel cell system, or any other apparatus or system that can generate power (electrical or mechanical or other) from hydrogen, methane, and/or carbon monoxide gas. On-site power generation may be used to support driver gas production processes as well as driver gas compression and injection. In some driver gas production scenarios, an excess of power is available and could be fed through the electrical power grid to generate additional revenue.

A control module is provided that is capable of controlling the operation of the system both automatically and with user-input. The control module may use subsurface data to automatically regulate the operation of the system via feedback control. This allows the system to operate with minimal human supervision or labor. The subsurface data may include total pressure, partial pressure of carbon dioxide, partial pressure of hydrogen, temperature, and/or viscosity of the oil. The control module may also include a set of controls for user-control of the system.

A gas capture module is provided that is capable of re-capturing a portion of the driver gas and recycling the driver gas. The gas capture module allows the $CO_2$ and hydrogen that is released with the oil emerging from the ground to be re-captured and sent via the compressor module underground for reuse. The gas capture module increases the overall efficiency of the oil recovery operation, because a portion of the generated driver gas is recycled and reused.

In one embodiment, a gas capture module is created by pumping the oil into a vessel with a certain amount of ullage space above the oil, and drawing suction on the ullage with another pump. This operation will lower the vapor pressure of carbon dioxide and hydrogen above the oil, allowing gases in solution to outgas so that they can be recycled back into the well. Various gas capture modules are within the scope of the present invention, and the present invention is not limited to the particular gas capture modules or methods shown or described here, as long as the gas capture modules or methods are capable of capturing at least a portion of the driver gas emerging with the oil from the oil well.

Figure 7:
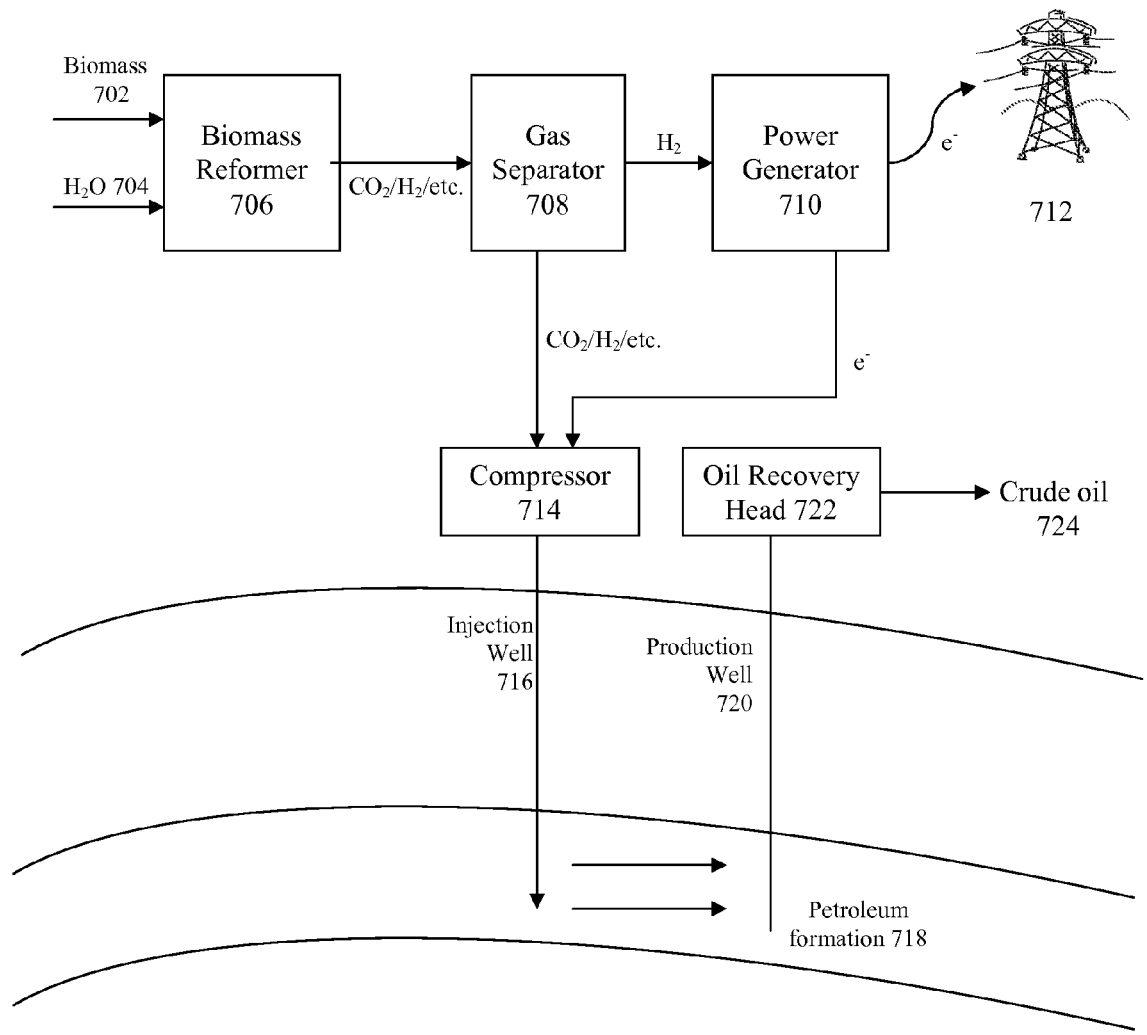
FIG. 7 illustrates another example of an embodiment of the present invention for the extraction of oil from an oil well and for the generation of electricity.

FIG. 7 illustrates one example of a modular embodiment 700 of the present invention for extracting oil from an oil well and for generating electricity. This example is illustrative only, and is not intended to limit the scope of the present invention. Processed biomass 702 and water 704 are fed into biomass reformer 706. The biomass and water may also be fed pre-mixed as biomass-water slurry. Generated driver gases, which may include $CO_2$, $H_2$, as well as other gases, are fed into gas separator 708, which separates a portion of the carbon dioxide gas from the hydrogen gas as well as the other gases. A portion of the hydrogen gas, and potentially methane and carbon monoxide gas, is fed into power generator 710, which could be a gas turbine, to generate electricity. A portion of the electricity is fed into the electric grid 712. A portion of the electricity is used on-site, to provide power to various modules, such as the compressor 714.

The separated $CO_2$ gas, as well as potentially other gases, are compressed by compressor 714 for injection into injection well 716. The driver gases, including the carbon dioxide as well as potentially a portion of the hydrogen gas, and potentially other gases (such as $N_2$), pressurize the underground petroleum formation 718 and reduce its viscosity. The crude oil 724 is more amenable to recovery by oil recovery head 722 via production well 720, or other like site.

Figure 8:
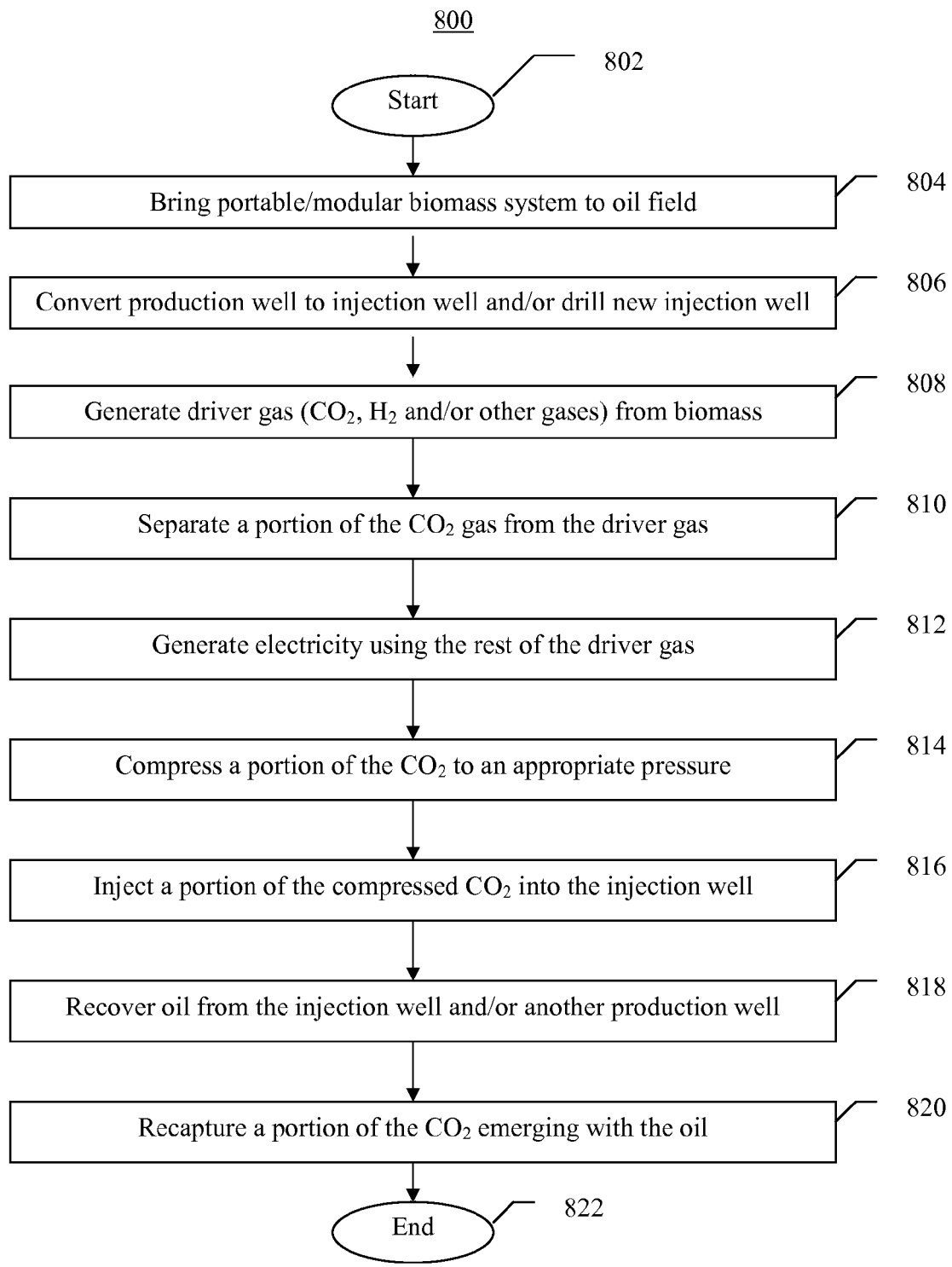
FIG. 8 illustrates yet another example of operations for extracting oil from an oil well and generating electricity, in accordance with an embodiment of the present invention.

FIG. 8 illustrates an example of operations for extracting oil from an oil well and generating electricity, in accordance with the embodiment of FIG. 7. Process 800 begins in step 802. A portable/modular biomass reformer according to the present invention is brought to an oil field, as shown in step 804. An existing production well is converted to an injection well and/or a new injection well is drilled, as shown in step 806. Driver gas, comprising $CO_2$, $H_2$, and/or other gases is generated from biomass or a derivative of biomass using the portable biomass reformer, as shown in step 808. A portion of the $CO_2$ gas is separated from the rest of the driver gas, as shown in step 810. Using the rest of the driver gas, electricity is generated, as shown in step 812. The electricity may be used locally and/or fed into the electric grid for additional revenue. A portion of the $CO_2$ intended for underground use is compressed to an appropriate pressure, as shown in step 814. A portion of the compressed $CO_2$ is injected into the injection well, as shown in step 816. Oil is recovered from the same injection well ("Huff-and-Puff") and/or another production well, as shown in step 818. A portion of the $CO_2$ emerging with the oil from the oil well is re-captured for reuse underground, as shown in step 820. The process 800 ends at step 822.

The operation, inter-connection, and use of the various modules are described in detail throughout this disclosure. These modular components may be mixed and matched by an operator of the present invention in appropriate combinations based on local conditions and market prices. For example, if the oil site has a high power requirement, or the local cost of electricity is high, the $H_2$ gas may be separated from the $CO_2$ gas using a gas separator as described above, and the $H_2$ gas may be burned in a gas turbine to generate electricity. The electricity may be used on-site to provide power for the oil field, or sold to an electric distribution company to generate additional revenue by feeding the electricity into the electric grid. Therefore, a portable and modular system is provided for enhancing oil recovery and generating electricity wherever a candidate oil field may be, including off-shore and remote oil fields.

Figure 11:
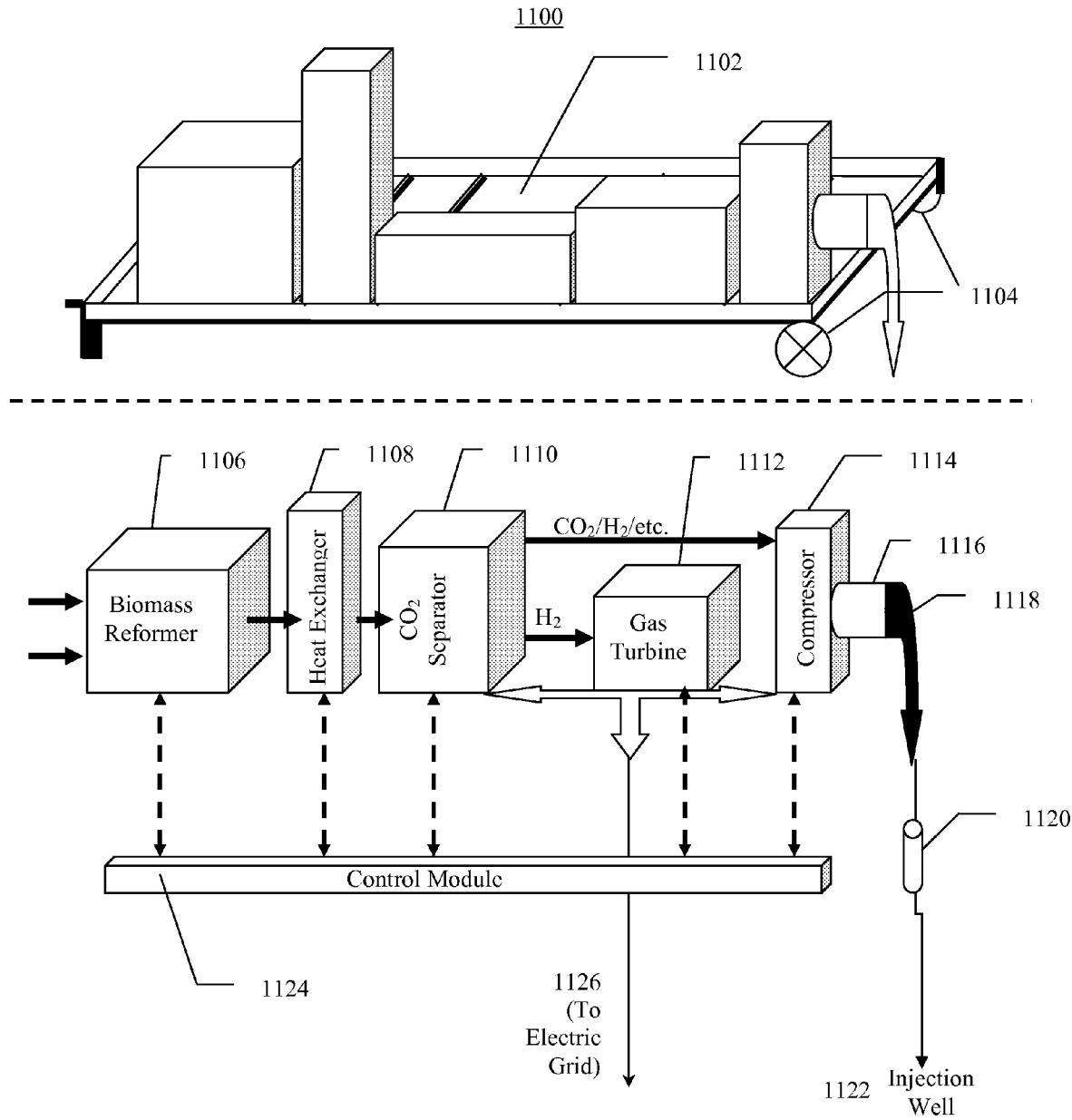
FIG. 11 illustrates yet another example of a portable, modular embodiment of the present invention for the extraction of oil from an oil well and for the generation of electrical power.

FIG. 11 illustrates one example of one embodiment 1100 of the present invention for extracting oil from an oil well and for generating electricity. This example is illustrative only, and is not intended to limit the scope of the present invention. A chassis 1102, having two wheels 1104 for surface transportation, supports five modules. The chassis slots are used to house a biomass reformer 1106, a heat exchanger 1108, a $CO_2$ separator 1110, a gas turbine 1112, and a compressor 1114, respectively. An injection port 1116 is attached to the compressor 1114. Driver gas 1118 exits the compressor 1114 via the injection port 1116 and is sent via injection line 1120 deep into oil well 1122.

A control module 1124 is used to control the operation of each module 1106-1116 via bi-directional communication lines (shown as dashed lines). A gas capture module (not shown) may also be used to re-capture a portion of the driver gas that emerges with the oil from the oil well.

The modules are placed on the chassis 1102 and interconnected in the appropriate fashion. The biomass reformer 1106 is connected to biomass-water slurry pipe and oxygen pipe (shown as bold arrows) for receiving the reforming reaction fuel and water sources. The heat exchanger 1108 is appropriately connected to the biomass reformer 1106. The $CO_2$ separator 1110 takes a feed from the biomass reformer 1106 via heat exchanger 1108 and outputs at least two gas streams, one of $CO_2$ and another of $H_2$ and other gases. The $H_2$ stream is fed to the gas turbine 1112, while the $CO_2$ stream is fed to the compressor 1114 (shown as black arrows). Thus, the $CO_2$ separator 1110, the gas turbine 1112, and the compressor 1114 are appropriately interconnected. The injection line 1120 is appropriately connected to the compressor 1114 via injection port 1116; the injection line 1120 leads deep into the injection well 1122.

In addition, the gas turbine 1112 may be used to provide power to the $CO_2$ separator 1110, as well as the compressor 1114, via electrical or mechanical linkages (shown as white arrows). The gas turbine 1112 may also produce surplus electricity, which may be sold for additional revenue to a utility company by directly feeding electricity into the electric grid (shown as arrow 1126).

This is but one system configuration that is possible utilizing the modular components of the present invention, and the present invention is not limited to this particular configuration. For example, an operator who does not wish to generate electricity, and/or an operator who wishes to use all of the hydrogen gas along with the carbon dioxide gas for enhanced oil recovery, would not use a gas separator or power generator module, but would still use a biomass reformer and a compressor. As another example, an operator who wishes to operate a hydrogenation plant near the oil well may chose to use a gas separator module to separate the hydrogen, but may chose not to use a power generator module. Such an operator would still use the other modules, and would feed the separated hydrogen gas to the hydrogenation plant.

Figure 12:
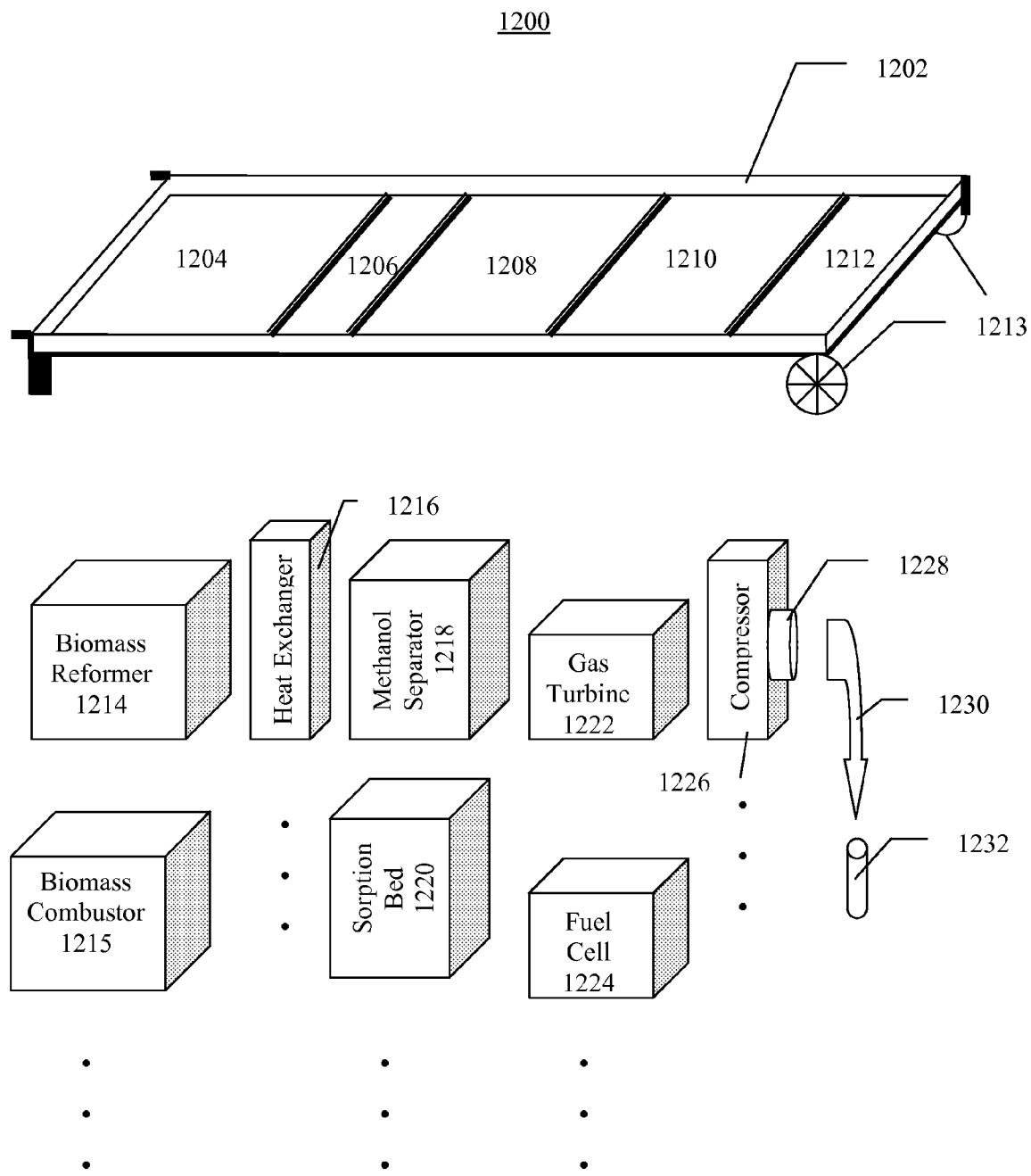
FIG. 12 illustrates yet another example of a portable, modular embodiment of the present invention for the extraction of oil from an oil well and for the generation of electrical power.

FIG. 12 illustrates another example of a modular embodiment of the present invention 1200 having a chassis 1202 to support one or more modules. Chassis slots 1204, 1206, 1208, 1210, and 1212 may be used to house a reaction module, a heat exchange module, a gas separator module, a power generator module, and/or a compressor module. The chassis may have one or more wheels 1213 for surface transportation, or the chassis may rely on the wheels of the vehicle on which it is mounted. FIG. 12 shows that one or more interchangeable modules may be used in each of the chassis slots 1204-1212. For example, any of a number of reaction modules, including various reformer modules, a combustion module, a gasification module, etc. may be used in slot 1204. A biomass reformer module 1214 and a biomass combustion module 1215 are shown for illustrative purposes only. A local oil combustion module, a methanol reformer module, or any other reaction module according to the principles of the present invention may be used in chassis slot 1204. Any heat exchange module, such as heat exchanger 1216, may be used in slot 1206. Any gas separator module, such as methanol $CO_2$ separator module 1218 or sorption bed 1220, may be used in slot 1208. Any power generator module, such as gas turbine 1222 or fuel cell 1224, may be used in slot 1210. Any compressor module, such as compressor 1226, may be used in slot 1212. Any gas injection module, such as injection port 1228, may be attached to the compressor module 1226. The gas injection module may be a port, a hole, or any interconnecting interface between the compressor module 1226 and the injection line 1232. Driver gas 1230 exits the compressor module 1226 via injection module 1228 and is sent deep into an oil well via injection line 1232.

The modules are placed on the chassis 1202 and interconnected in the appropriate fashion. For example, the heat exchange module 1216 is appropriately connected to the reaction module 1214 (or 1215). The gas separator module 1218 (or 1220) takes one feed from the reaction module 1214 (or 1215), and outputs at least two streams of gas, one stream of $CO_2$ gas and another stream of $H_2$ and other gases. The $H_2$ stream is fed to the power generator module 1222 (or 1224), while the $CO_2$ stream is fed to the compressor module 1226. Thus, the gas separator module 1218 (or 1220), the power generator module 1222 (or 1224), and the compressor module 1226 are appropriately interconnected. The injection module 1228 and the injection line 1232 are appropriately interconnected with the compressor module 1226.

Compressor and Injection Modules

In many oil wells, the driver gas must be compressed to high pressure before it may be injected into the oil well. This is due to the fact that the oil well may already be at a high pressure from methane and other gases in solution as well as previous driver gas injection. In addition, pressure generally increases with depth underground. The compressor module is used to compress the driver gas to a pressure appropriate for oil recovery. The compressor module is capable of compressing the $CO_2$ as well as a portion of the hydrogen intended for underground use to high pressure.

Various types of gas compressor modules may be used to compress the driver gas before injection into the oil well. Numerous types of compressors are available, but all are stand alone modules built for the flow, pressure, and temperature design parameters of the PRESEOR. These modules may be built to operate using electric motors to provide the proper rotation speed and power input. However, air-driven motors or internal combustion engines may also be used. Alternate drives such as mechanical linkage to the power generator module are also possible, as described below.

Compressors for $CO_2$, $H_2$, or a combination of these gases may be based on lubricated or non-lubricated rotary, centrifugal, or reciprocating designs. These types of compressors may use seals around the rotary or reciprocating shafts.

Another class of compressors that may be used to compress driver gas is based on metal diaphragms. These are available from different manufacturers for a wide range of flow rate and pressure requirements. This class of compressors is designed so that no lubricant or coolant comes in contact with the process gas. Only the metal diaphragm and elastomeric seals contact the process gas.

The compressor may be effectively explosion proof. This can be accomplished by using an explosion-proof pump, or alternatively by housing a pump that is not rated explosion-proof within an air-tight container that provides an inert environment.

Designs of compressors may be found in U.S. Pat. No. 6,431,840 to Mashimo et al., U.S. Pat. No. 5,769,610 to Paul et al., U.S. Pat. No. 5,674,053 to Paul et al., and U.S. Pat. No. 5,033,940 to Baumann.

Various compressors are within the scope of the present invention, and are not limited to the designs and configurations illustrated and described here, so long as the compressors can compress the driver gas to a pressure appropriate for injection into the oil well.

The injection module is used to eject the driver gas from the PRESEOR into an injection line, while the injection line is used to send the driver gas deep into the oil well for use in oil extraction. The injection module may be a port, a hole, or interlocking mechanism for connecting the compressor module to the injection line. The injection line feeds the driver gas down the injection well. Various injection modules and injection lines are within the scope of the present invention, and are not limited to the specific designs and configurations illustrated and described here.

Power Generator Modules

The hydrogen gas separated by the gas separator module may be used to generate power. The power may be used on-site to provide power to various sub-systems, or modules, or alternatively the power may be sold for additional revenue. The power generator module utilizes a portion of the hydrogen gas separated by the gas separator module to generate power. In one embodiment, the power generator module is used to generate electricity. In another embodiment, the power generator module is used to generate mechanical power for the compressor module. In one embodiment, the electricity is sold to a utility company by feeding the electricity into the electric grid. The power generator module may be a combustion turbine, a steam turbine, a fuel cell, or any other apparatus, system, or module that can generate power (electrical or mechanical or other) from hydrogen gas.

According to one embodiment of the power generator module utilizing a combustion turbine, hydrogen is fed with air to generate power through a rotating shaft. Designs of hydrogen gas turbine plants are described in U.S. Pat. No. 5,755,089 to Vanselow, U.S. Pat. No. 5,687,559 to Sato, and U.S. Pat. No. 5,590,518 to Janes. Designs of hydrogen internal combustion engines are described in U.S. Pat. No. 7,089,907 to Shinagawa et al., U.S. Pat. No. 4,508,064 to Watanabe, and U.S. Pat. No. 3,918,263 to Swingle.

Another embodiment of the power generator module uses a steam turbine. A variety of fuels may be used, including a portion of the separated hydrogen, part of the coal or other feedstock material, or even waste hydrocarbon gases. The fuel is burned in air in a combustion chamber to generate heat. The heat is transferred to a closed-loop steam/water system through a series of heat exchangers designed to recover the combustion heat. The high-pressure steam drives a turbine for power generation. In one embodiment, the combustion turbine and steam turbine may be integrated to boost efficiency.

The combustion and steam turbine shafts may be connected to generators to produce electrical power. However, they may also be used to produce mechanical power from the turbine shaft (for direct drive of the gas compressor module, for example).

As an alternative to combustion, in one embodiment of the present invention, a fuel cell module may be used to convert hydrogen directly to electricity, usually with greater efficiency albeit at a higher capital cost. The fuel cell module, an electrochemical energy conversion device, produces electricity from the hydrogen fuel (on the anode side) and oxidant (on the cathode side). The hydrogen and oxidant (which may be ambient oxygen) react in the presence of an electrolyte. The reactants (hydrogen and oxygen) flow in and reaction products (water) flow out, while the electrolyte remains in the cell.

The fuel cell can operate virtually continuously as long as the necessary flows of hydrogen and oxidant are maintained. Designs of fuel cell plants are described in U.S. Pat. No. 6,893,755 to Leboe, U.S. Pat. No. 6,653,005 to Muradov, U.S. Pat. No. 6,503,649 to Czajkowski et al., U.S. Pat. No. 6,458,478 to Wang et al., U.S. Pat. No. 5,079,103 to Schramm, U.S. Pat. No. 4,659,634 to Struthers, and U.S. Pat. No. 4,622,275 to Noguchi et al.

Various power generator modules are within the scope of the present invention, and are not limited to the particular power generators shown or described here, so long as the power generators can generate power, whether electrical, mechanical, or other, from hydrogen gas.

Control Modules

A control module is used to control the operation of the PRESEOR both automatically and based on user-input. The control module may use subsurface data to automatically regulate the operation of the system via feedback control. This allows the PRESEOR to operate with minimal human supervision or labor. The control module also provides an interface for an operator to control, maintain, and supervise the operation of the PRESEOR.

The subsurface data used to control the PRESEOR may include total pressure, partial pressure of carbon dioxide, partial pressure of hydrogen, oil flow rate, gas flow rate, underground temperature, and/or viscosity of the oil. A pressure measurement probe leading down the injection line may measure the total underground pressure. Similarly, the underground partial pressure of the carbon dioxide gas and the partial pressure of the hydrogen gas may be measured by a carbon dioxide/hydrogen pressure probe leading down the injection line. The control module can control the system based on the total measured pressure, as well as the measured partial pressures of hydrogen and/or carbon dioxide gas.

The oil flow rate may be measured by a flow meter, and the control module may control the system based on the reading from the oil flow meter. Additionally, the driver gas flow rate may also be measured by a second flow meter attached to the injection module, and the control module may control the system based on the reading from the driver gas flow meter. The oil flow meter and the driver gas flow meter may also serve a secondary purpose of metering the amount of oil extracted and the amount of driver gas used for system maintenance, optimization, as well as billing purposes. For example, an operator of the system who leases the equipment may pay a leasing fee based on the amount of oil extracted or the amount of driver gas generated.

The control module may also measure the underground temperature of the oil using a temperature probe leading down the injection line, and control the system based on the measured underground temperature. A viscosity probe leading down the injection line may measure the viscosity of the underground oil, and the control module can control the system based on the measured underground viscosity of the oil. The control module may also use other subsurface parameters, or data taken from measurement probes, to automatically regulate the operation of the fuel reformer module, the injection module, and the other sub-systems (modules).

In one embodiment, a control method for controlling the PRESEOR includes the steps of measuring total pressure inside the oil well, and controlling the driver gas output from the PRESEOR based on the total pressure. The control method may increase the output from the reformer module when the measured pressure is below a predetermined threshold, and decrease the output from the reformer module when the measured pressure is above a predetermined threshold.

In another embodiment, a control method for controlling the PRESEOR includes the steps of measuring the partial pressure of hydrogen inside the oil well, and controlling the injection module based on the measured pressure. The control method may control the gas separator module to separate hydrogen gas from the driver gas, and control the injection module to output more hydrogen gas when the measured partial pressure of hydrogen is below a predetermined threshold, and to output less hydrogen gas when the measured partial pressure of hydrogen is above a predetermined threshold.

In yet another embodiment, a control method for controlling the PRESEOR includes the steps of measuring the partial pressure of carbon dioxide, and controlling the injection module based on the measured pressure. The control method may control the gas separator module to separate carbon dioxide gas from the driver gas, and control the injection module to output more carbon dioxide gas when the measured partial pressure of carbon dioxide is below a predetermined threshold, and to output less carbon dioxide gas when the measured partial pressure of carbon dioxide is above a predetermined threshold.

In yet another embodiment, a control method for controlling the PRESEOR includes the steps of measuring the viscosity of the oil, and controlling the injection module based on the measured viscosity. The control method may control the injection module to output more driver gas when the measured viscosity is below a predetermined threshold and to output less driver gas when the measured viscosity is above a predetermined threshold.

In yet another embodiment, a control method for controlling the PRESEOR includes the steps of measuring the flow rate of the oil, and controlling the injection module based on the measured oil flow rate. The control method may control the injection module to output more driver gas when the measured oil flow rate is below a predetermined threshold and to output less driver gas when the measured oil flow rate is above a predetermined threshold.

In yet another embodiment, a control method for controlling the PRESEOR includes the steps of measuring the gas flow rate of the driver gas, and controlling the injection module based on the measured gas flow rate. The control method may control the injection module to output more driver gas when the measured gas flow rate is below a predetermined threshold and to output less driver gas when the measured gas flow rate is above a predetermined threshold.

The above control methods may be implemented as a control system using negative feedback for controlling the PRESEOR to extract oil from an oil well in an optimal fashion. The control methods may be implemented in software, which may be stored on one or more computer-readable storage media. The computer-readable media may be used in a general-purpose computer to control the operation of the PRESEOR.

The control module may also be used to control the apparatus based on input from a human operator. The control module may include a set of controls, or a user interface running on an operating system, for user-driven control of the PRESEOR. The control module may be remotely operated, such as over the Internet or other network, in order to allow increased flexibility and remote surveillance and monitoring of the operation of the PRESEOR. An operator may remotely, automatically, and intelligently control the operation of several different PRESEOR units situated in several different oil wells (which may be situated at several different oil fields, which may be spaced hundreds or even thousands of kilometers apart) from a single control terminal located anywhere on the Internet.

For example, the human operator may use the control module to control the gas separator module and the power generator module based on the local price of electricity. That is, if the local price of electricity has increased and/or the oil site requires more power, the human operator may chose to divert more of the hydrogen to electricity generation rather than for use in oil recovery. The opposite condition may hold if the local price of electricity dropped or if the market price of oil rose; in this case the human operator may divert more of the hydrogen gas for enhanced oil recovery. (Alternatively, this optimization operation may be performed automatically by the control module based on inputs of the market prices and other parameters.) The human operator may also use the control module to turn the apparatus on or off and as well as perform other day-to-day operations and system maintenance.

Various control modules and control methods are within the scope of the present invention, and the present invention is not limited to the particular control modules or control methods shown or described here. In addition, parameters other than the ones described here may be used to automatically control the PRESEOR, and all such parameters are within the scope of the present invention.

Scale of Operations

The scale of the reformer developed for the PRESEOR is important. Most existing reformers are either very small (outputs of a few cf/day to a few kcf/day) units designed for use in conjunction with fuel cells, or massive systems designed for use in the chemical industry or in conjunction with major central power plants, with outputs of billions of cf/day. In contrast, the EOR application requires output on the order of a million cf/day, roughly three orders of magnitude larger than typical fuel cell systems and three orders of magnitude smaller than large-scale industrial systems.

The scale of the present invention is simultaneously portable and also sized to generate sufficient driver gas for economic recovery of oil. For example, consider a near-depleted oil well that presently generates 100 barrel of oil per day. Established industry guidelines estimate 1 additional barrel of oil recovered for every 5,000 to 10,000 standard cubic feet (5-10 kcf) of $CO_2$ injected into a near-depleted oil well. (A value of 10 kcf of $CO_2$ per barrel of oil recovered will be used hereafter as a conservative estimate.) Therefore, in order to bring the capacity of the near-depleted oil well up from 100 Ba/day to 200 Ba/day, the present invention should be sized to generate approximately 1,000,000 standard cubic feet (1,000 kcf) of $CO_2$ per day. That is, in one embodiment of the present invention used for enhanced oil recovery in an oil field producing an additional 100 barrels per day, an embodiment of the present invention should be sized to produce an output of $CO_2$ gas on the order of one million cubic feet per day (1 MMcf/day).

However, the present invention is by no means limited to an apparatus that produces $CO_2$ at a rate of 1 MMcf/day. For example, if an oil well is expected to produce an additional 10 Ba/day, an embodiment of the present invention may be sized to produce an amount of $CO_2$ equal to approximately 100,000 standard cubic feet (100 kcf) per day. Alternatively, if an oil field is expected to produce an additional 1,000 Ba/day, an embodiment of the present invention may be sized to produce an amount of $CO_2$ equal to approximately 10 million standard cubic feet (10 MMcf) per day. Since the volume of the reaction chamber, and hence the volume of $CO_2$ produced, grows as the cube of the linear dimension of the reaction chamber, an apparatus that produces 10 times the amount of $CO_2$ would have a linear footprint increase of approximately 2.2 (cube-root of 10). That is, an apparatus sized to produce 10 MMcf/day of $CO_2$ would only be sized about two times larger in each linear dimension (or four times the footprint area) than an apparatus designed to produce 1 MMcf/day of $CO_2$.

Alternatively, an operator of an oil field may chose to utilize two or more smaller reformer modules in place of a larger reformer module. For example, consider an operator of an oil field described above producing an additional 100 Ba/day. Such an operator needs approximately 1 million cubic feet of $CO_2$ per day (1 MMcf/day). Instead of utilizing one large reformer module, an operator may chose to utilize four (4) smaller reformer modules, each sized to produce 250,000 cubic feet of $CO_2$ per day (250 kcf/day). One potential advantage of utilizing four smaller reformer modules instead of one large reformer module is the ability to space the four reformer modules easily around a single well. Another potential advantage of utilizing multiple smaller reformer modules over a large reformer module is the greater flexibility in transportation of the smaller modules. Finally, another potential advantage of utilizing multiple smaller reformer modules is the standardization and economies of scale that are possible in manufacturing a unit of standardized size which is replicated for larger operations.

Therefore, based on the above analysis, it is apparent that an apparatus according to the present invention may be produced/manufactured for any appropriate oil well and/or oil field size at only a small incremental increase in production/manufacturing cost. Therefore, the present invention is a highly economical, highly portable, and highly modular apparatus that may be customized to an oil well and/or oil field of any size.

As shown above, the amount of hydrogen produced by reforming sufficient biomass to produce 1 MMcf/day of carbon dioxide driver gas is also sufficient to produce about 2 Megawatts (MW) of electric power. This is a convenient size to feed meaningful amounts of electricity into an electric power grid to support growth of demand faced by power companies in a modular fashion, without the need for massive investment in new, large-scale (approximately 250-1000 MW) facilities. Thus, the mass production and deployment of the present invention could be potentially very attractive to utility companies, allowing them to meet their customer's demand for increased supply, without the risk of major investments in large facilities, while receiving their power from a constant, regularly-available, carbon-emission-free source. This is in contrast to supplementing utility power with wind turbines, solar cells, and the like, whose power, while also carbon-emissions-free, is only available on an intermittent, irregular basis.

Various alternative sizes may be attractive. Therefore, the present invention may be sized appropriately, and any mention of particular sizes in this description is illustratively of but a few particular embodiments of the present invention, and is not meant to limit the scope of the present application to any particular size described.

Environmental Impact

Therefore, what are described here are a system, method, and apparatus for reducing the amount of $CO_2$ in the atmosphere. The oil, even when combusted, has net negative $CO_2$ emission, since the amount of $CO_2$ pumped underground is more than the amount of $CO_2$ released when the oil is combusted ("green oil"). The electricity generated is clean, since no $CO_2$ was emitted into the atmosphere ("green electricity").

Finally, it may be noted that the oil produced by the PRESEOR will come from existing wells that are otherwise considered tapped out, and thus it will allow the nation to provide itself with adequate supplies of domestic oil without the need to drill in pristine wilderness areas.

Alternative Embodiments

Figure 13:
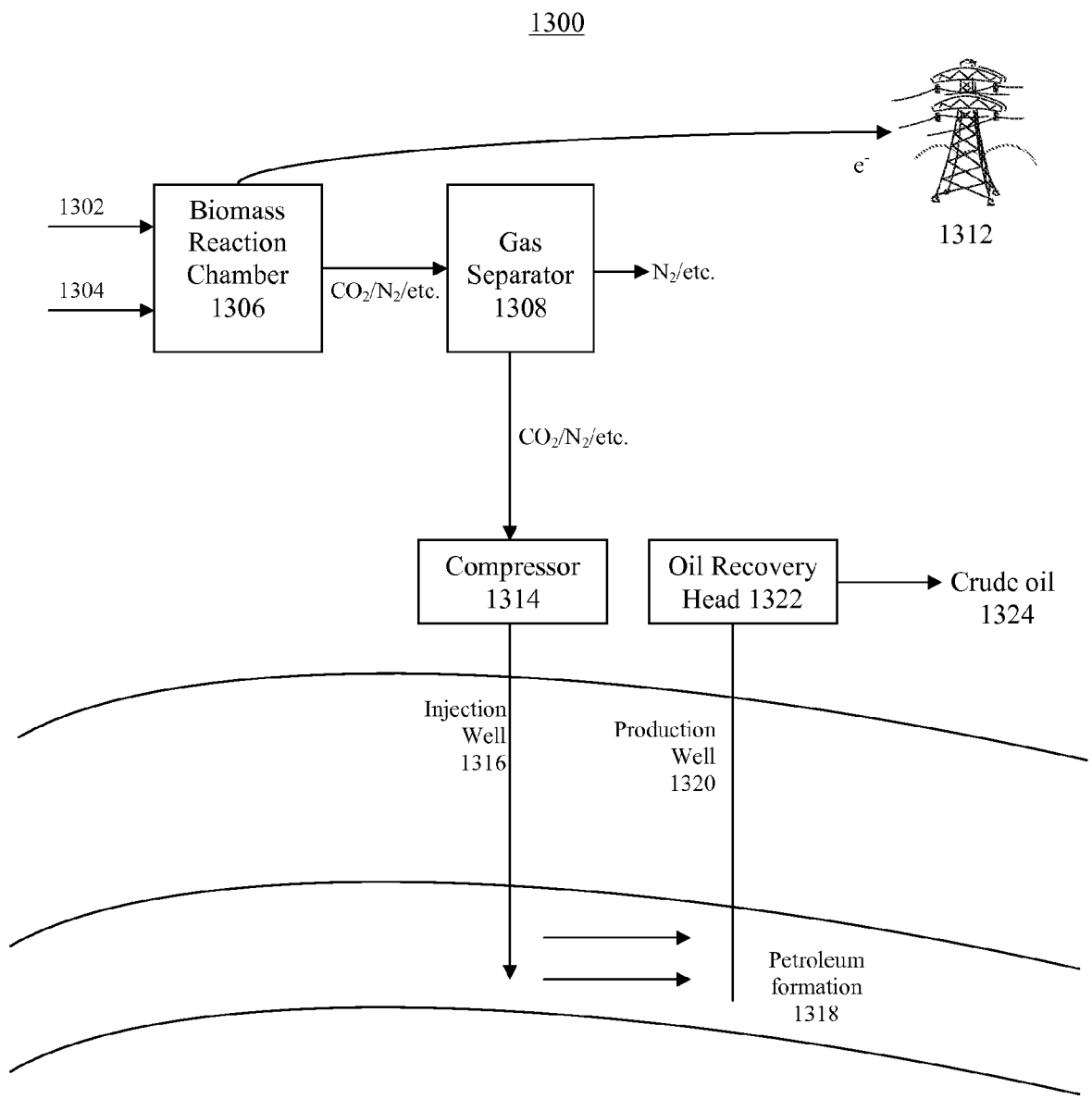
FIG. 13 illustrates yet another example of yet another embodiment of the present invention for the extraction of oil from an oil well and for the generation of electrical power using biomass combustion or biomass gasification combined with water-gas-shift reaction in place of biomass reforming.

As an alternative to using a reforming reaction to generate driver gas, it is an alternative embodiment of the present invention to use combustion and/or gasification followed by water-gas-shift reaction to generate driver gases, and still be within the spirit and scope of the present invention. In general, a reforming reaction is preferable to using combustion or gasification using air because either reaction would produce driver gas mixed with large amounts of nitrogen from air, which is undesirable. As an alternative to using air-blow combustion or gasification, it is another embodiment of the present invention to use oxygen-blown combustion or gasification, and still be within the spirit and scope of the present invention. In general, a reforming reaction is still preferable to using oxygen-blown combustion or gasification, because in either case, a source of pure oxygen is required, which must be separated from air, introducing an additional expense. FIG. 13 shows an illustrative embodiment of the present invention using an air-blown biomass combustion reaction for purposes of illustration.

FIG. 13 illustrates an example of yet another alternative embodiment 1300 of the present invention for extracting oil from an oil well and for generating electricity, using an air-blown biomass combustion reaction. This example is illustrative only, and is not intended to limit the scope of the present invention. Processed biomass 1302 and air 1304 are fed into biomass reactor 1306. Generated driver gases, which may include $CO_2$, $N_2$, as well as other gases, are fed into gas separator 1308, which separates a portion of the carbon dioxide gas from the other driver gases. A portion of the electricity is fed into the electric grid 1312. A portion of the electricity may be used on-site (not shown). The separated portion of the $CO_2$ gas is compressed by compressor 1314 for injection into injection well 1316. The driver gases, including the carbon dioxide as well as potentially a portion of the nitrogen gas, and potentially other gases, pressurize the underground petroleum formation 1318 and reduce its viscosity. The crude oil 1324 is more amenable to recovery by oil recovery head 1322 via production well 1320, or other like site.

According to yet another embodiment of the present invention, disclosed herein is an apparatus for removing oil from an oil well. In one example, the apparatus may include a first storage container for storing a combustible material used in a combustion reaction; a second storage container for storing biomass or biomass derivative used in the reforming reaction; a third storage container for storing water to be reacted with the biomass in the apparatus; a first chamber having an inlet and an outlet, the first chamber for combusting the combustible material with ambient oxygen for the release of energy, the inlet of the first chamber fluidly coupled with the first storage container; and a second chamber having an inlet and an outlet, the inlet of the second chamber fluidly coupled with the second and third storage containers, a portion of the second chamber positioned within a portion of the first chamber, the second chamber fluidly isolated from the first chamber. In one example, the energy released in the first chamber heats the biomass and water sources used in the reforming reaction in the second chamber to a temperature above that necessary for the reforming reaction to proceed, thereby reforming the biomass and water sources into driver gas exiting the outlet of the second chamber.

In one example, the first chamber includes an igniter for igniting the combustible material, and the second storage container may include a mixture of water with biomass.

In another embodiment, the apparatus may include a first heat exchanger coupled with the outlet of the first chamber and thermodynamically coupled with the second chamber, the first heat exchanger for pre-heating the biomass and/or water sources. The apparatus may also include a second heat exchanger coupled with the outlet of the second chamber and thermodynamically coupled with the inlet of the second chamber, the second heat exchanger for pre-heating the biomass and/or water sources and for cooling the generated driver gas.

According to another embodiment of the present invention, disclosed herein is an autothermal apparatus for generating driver gas to remove oil from an oil well. In one example, the apparatus may include a single reaction chamber for combining biomass, water, and an oxidizer; a biomass delivery belt for delivery of biomass; a pipeline for delivery of water; an oxidizing agent delivery pipe for delivery of oxygen or other oxidizing agent; and a driver gas outlet port for removal of driver gas produced in the reaction chamber. In one example, a counter-flow heat exchanger provides energy/heat from the released driver gas to the incoming water to facilitate the autothermal reformer reaction in the reaction chamber.

In one example of the autothermal reformer apparatus, a reaction chamber heater pre-heats the reaction chamber to initiate the biomass reforming reaction and subsequent formation of driver gas.

Another embodiment of the present invention is a hydrocarbon, which when combusted, releases less carbon dioxide than the amount of carbon dioxide sequestered underground during a process of extracting the hydrocarbon.

Yet another embodiment of the present invention is a petroleum product extracted by a process comprising the steps of injecting carbon dioxide into an injection well, and recovering the petroleum product from a production well, where an amount of carbon dioxide injected into the injection well is greater than or equal to an amount of carbon dioxide released into the atmosphere when the petroleum product is combusted.

Yet another embodiment of the present invention is a method for removing carbon dioxide from the atmosphere, and hence helping mitigate global warming, the method comprising the steps of: providing a biomass reaction apparatus; providing biomass for the biomass reaction apparatus; generating carbon dioxide gas from the biomass using the biomass reaction apparatus; and utilizing the carbon dioxide gas in a manner that substantially does not release the carbon dioxide gas into the atmosphere.

Other embodiments of the present invention include the method above, but where the biomass reaction is selected from the group consisting of steam reforming, combustion, gasification, and gasification combined cycle.

Another embodiment of the present invention is the method above, where the carbon dioxide gas is used to grow algae. Yet another embodiment of the present invention is the method above, where the carbon dioxide is sequestered underground. Yet another embodiment of the present invention is the method above, where the carbon dioxide is used for enhanced oil recovery (EOR).

CONCLUSION

Any economic analyses described here illustrates that driver gases generated by the present invention may be profitably used to extract oil from underground or underwater sources, such as depleted oil wells, while also producing further profit through the production of electricity without net carbon dioxide emissions. The economic analysis is illustrative only, and is not intended to limit the scope of the present invention. Various economic parameters, assumptions, and conditions will affect the economic analysis in various ways. However, the present invention is intended to operate under all such economic conditions.

Any environmental and $CO_2$ analyses described here illustrates that driver gases generated by the present invention may be used to extract oil from underground or underwater sources while also reducing carbon dioxide emissions, and under certain scenarios having a net effect of actually taking carbon dioxide out of the atmosphere. The environmental analysis is illustrative only, and is not intended to limit the scope of the present invention.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the spirit and scope of the present invention.

What is claimed is:

1. A portable apparatus for extracting low carbon petroleum and for generating low carbon electricity from biomass and water, comprising:
   a boiler adapted to boil the water to generate a high-pressure steam source;
   a biomass hopper having a source of biomass;
   a steam reformer adapted to react the biomass with the steam to generate a high-pressure gas comprising a majority of carbon dioxide gas and hydrogen gas;
   a methanol $CO_2$ separator adapted to separate at least a portion of the carbon dioxide gas from the high-pressure gas to generate a carbon dioxide-rich driver gas and a hydrogen-rich fuel gas;
   a gas turbine adapted to utilize a portion of the hydrogen-rich fuel gas to generate low carbon electricity;
   appropriate for injection into a petroleum reservoir to extract low carbon petroleum; and
   wherein the steam reformer, the methanol $CO_2$ separator, the gas turbine and the compressor are located on a portable chassis.

2. The apparatus of claim 1, further comprising:
   a heat exchanger disposed between the boiler and the steam reformer adapted to exchange heat between the hot high-pressure gas exiting the steam reformer and the steam entering the steam reformer from the boiler.

3. The apparatus of claim 2, further comprising:
   a condenser disposed after the heat exchanger adapted to condense cooled high-pressure gas entering the $CO_2$ separator from the heat exchanger.

4. The apparatus of claim 1, wherein the boiler is structurally designed for a temperature of approximately 150° C. to 250° C.

5. The apparatus of claim 1, wherein the steam reformer is structurally designed to operate at a temperature above which biomass reforms, approximately 850° C.

6. The apparatus of claim 1, wherein the steam reformer is structurally designed to operate at a pressure of approximately 5 bar to 30 bar.

7. The apparatus of claim 1, wherein the $CO_2$ separator is structurally designed to operate in a methanol temperature-swing cycle between approximately −60° C. and +40° C.

8. The apparatus of claim 1, wherein the hydrogen-rich fuel gas further comprises methane.

9. The apparatus of claim 1, wherein the hydrogen-rich fuel gas further comprises carbon monoxide.

10. The apparatus of claim 1, further comprising:
    a control system adapted to control an operation of the apparatus based on a market price of biomass, a market price of electricity, and a market price of crude petroleum.

11. The apparatus of claim 1, wherein the carbon dioxide-rich driver gas is at least 90% $CO_2$ by weight.

12. The apparatus of claim 1, wherein the carbon dioxide-rich driver gas is at least 99% $CO_2$ by weight.

13. The apparatus of claim 1, wherein the steam reformer is structurally designed to carry out a steam-biomass reforming reaction approximately in accordance with a chemical equation $$C_xH_yO_z + H_2O \Rightarrow xCO_2 + wH_2,$$

wherein $C_xH_yO_z$ represents biomass, $H_2O$ represents water, $CO_2$ represents carbon dioxide, and $H_2$ represents hydrogen, and wherein carbon dioxide concentration $x/(x+w)$ in the high pressure gas is at least 30% carbon dioxide by weight.

14. The apparatus of claim 1, wherein the high-pressure gas contains at least 30% carbon dioxide gas by weight.

15. The apparatus of claim 1, wherein the electricity generated has substantially less associated carbon dioxide emissions than electricity generated from combustion of natural gas.

16. The apparatus of claim 1, wherein an amount of carbon dioxide released when the petroleum is consumed is less than an amount of carbon dioxide injected underground to extract the petroleum.

17. A system for extracting low carbon petroleum and for generating low carbon electricity from biomass and water, comprising:
    a high-pressure steam source for transforming the water into steam;
    a biomass hopper unit having a source of biomass;
    a steam reformer unit adapted to react the biomass with the steam to generate a high-pressure gas comprising a majority of carbon dioxide gas and hydrogen gas;
    a methanol $CO_2$ separator unit adapted to separate at least a portion of the carbon dioxide gas from the high-pressure gas to generate a carbon dioxide-rich driver gas and a hydrogen-rich fuel gas; and "appropriate for injection into a petroleum reservoir to extract low carbon petroleum; and wherein the steam reformer, the methanol $CO_2$ separator and the compressor are located on a portable chassis.

18. The system of claim 17, wherein the steam reformer unit is structurally designed to operate at a temperature above which biomass reforms, approximately 850° C., and a pressure of approximately 5 bar to 30 bar.

19. The system of claim 17, further comprising:

a gas turbine unit adapted to utilize a portion of the hydrogen-rich fuel gas to generate low carbon electricity, wherein the electricity generated has substantially less associated carbon dioxide emissions than electricity generated from combustion of natural gas.

20. The system of claim 17, wherein an amount of carbon dioxide released when the petroleum is consumed is less than an amount of carbon dioxide injected underground to extract the petroleum.

* * * * *